(12) United States Patent
Schipper et al.

(10) Patent No.: US 11,365,344 B2
(45) Date of Patent: *Jun. 21, 2022

(54) DELIVERY OF HALOGENS TO A SUBTERRANEAN FORMATION

(71) Applicant: Saudi Arabian Oil Company, Dhahran (SA)

(72) Inventors: Desmond Schipper, Houston, TX (US); Katherine Leigh Hull, Houston, TX (US); Younane N. Abousleiman, Norman, OK (US)

(73) Assignee: Saudi Arabian Oil Company, Dhahran (SA)

( * ) Notice: Subject to any disclaimer, the term of this patent is extended or adjusted under 35 U.S.C. 154(b) by 37 days.

This patent is subject to a terminal disclaimer.

(21) Appl. No.: 16/745,420

(22) Filed: Jan. 17, 2020

(65) Prior Publication Data

US 2021/0222051 A1 Jul. 22, 2021

(51) Int. Cl.
*C09K 8/588* (2006.01)
*C09K 8/92* (2006.01)

(52) U.S. Cl.
CPC .............. *C09K 8/588* (2013.01); *C09K 8/92* (2013.01)

(58) Field of Classification Search
CPC .......... C09K 8/524; C09K 8/588; C09K 8/70; C09K 8/92
See application file for complete search history.

(56) References Cited

U.S. PATENT DOCUMENTS

| 830,437 | A | 9/1906 | Humphrey |
| 2,900,269 | A | 8/1959 | Bauman et al. |
| 3,284,281 | A | 11/1966 | Thomas |
| 3,316,965 | A | 5/1967 | Watanabe |
| 3,716,387 | A | 2/1973 | Simmons et al. |
| 3,807,557 | A | 4/1974 | Miller |
| 3,926,575 | A | 12/1975 | Meyers |
| 3,977,472 | A | 8/1976 | Graham et al. |
| 3,996,062 | A | 12/1976 | Frost |
| 4,043,885 | A | 8/1977 | Yen et al. |
| 4,047,988 | A | 9/1977 | Weill |
| 4,195,010 | A | 3/1980 | Russell et al. |
| 4,220,550 | A | 9/1980 | Frenier et al. |

(Continued)

FOREIGN PATENT DOCUMENTS

| CA | 2322118 | 12/2007 |
| CN | 101819111 | 12/2011 |

(Continued)

OTHER PUBLICATIONS

PCT International Search Report and Written Opinion in International Appln. No. PCT/US2021/013616, dated May 6, 2021, 12 pages.

(Continued)

*Primary Examiner* — Frances Tischler
(74) *Attorney, Agent, or Firm* — Fish & Richardson P.C.

(57) ABSTRACT

Compositions and methods for treating kerogen in a subterranean formation by generating bromine and other halogens in situ in a subterranean formation. In some implementations, the generation of the bromine or halogen is delayed. This can occur, for example, by the decomposition of precursors, a chemical reaction, the encapsulation of precursors or reactants, or a combination of these approaches.

20 Claims, 18 Drawing Sheets

(56) References Cited

U.S. PATENT DOCUMENTS

| | | |
|---|---|---|
| 4,223,726 A | 9/1980 | Cha |
| 4,252,189 A | 2/1981 | Bodine |
| 4,289,639 A | 9/1981 | Buske |
| 4,324,560 A | 4/1982 | Fonseca |
| 4,381,950 A | 5/1983 | Lawson |
| 4,444,058 A | 4/1984 | Ratigan |
| 4,480,696 A | 11/1984 | Almond et al. |
| 4,493,875 A | 1/1985 | Beck et al. |
| 4,587,739 A | 5/1986 | Holcomb |
| 4,594,170 A | 6/1986 | Brown et al. |
| 4,640,692 A | 2/1987 | Audeh |
| 4,681,914 A | 7/1987 | Olson et al. |
| 4,708,805 A | 11/1987 | D'Muhala |
| 4,718,489 A | 1/1988 | Hallam et al. |
| 4,780,223 A | 10/1988 | Baranet et al. |
| 4,830,773 A | 5/1989 | Olson |
| 4,830,779 A | 5/1989 | Maeno et al. |
| 4,864,472 A | 9/1989 | Yoshimura |
| 4,887,670 A | 12/1989 | Lord et al. |
| 5,193,396 A | 3/1993 | Gorski |
| 5,213,705 A | 5/1993 | Olson |
| 5,302,297 A | 4/1994 | Barthrope |
| 5,435,187 A | 7/1995 | Ewy |
| 5,757,473 A | 5/1998 | Kanduth et al. |
| 5,759,964 A | 6/1998 | Shuchart |
| 5,869,750 A | 2/1999 | Onan |
| 5,999,887 A | 12/1999 | Giannakopoulos et al. |
| 6,076,046 A | 6/2000 | Vassudevan |
| 6,095,679 A | 8/2000 | Hammiche et al. |
| 6,138,760 A | 10/2000 | Lopez et al. |
| 6,165,295 A | 12/2000 | Wagaman |
| 6,227,295 B1 | 5/2001 | Mitchell et al. |
| 6,349,595 B1 | 2/2002 | Lorenzo et al. |
| 6,411,902 B1 | 6/2002 | Wiltshire |
| 6,488,091 B1 | 12/2002 | Weaver |
| 6,491,425 B1 | 12/2002 | Hammiche et al. |
| 6,494,263 B2 | 12/2002 | Todd |
| 6,516,080 B1 | 2/2003 | Nur |
| 6,579,572 B2 | 6/2003 | Espin et al. |
| 6,652,682 B1 | 11/2003 | Fawls |
| 6,705,398 B2 | 3/2004 | Weng |
| 6,729,409 B1 | 5/2004 | Gupta et al. |
| 6,749,022 B1 | 6/2004 | Fredd |
| 6,776,235 B1 | 8/2004 | England |
| 6,832,158 B2 | 12/2004 | Mese |
| 6,846,420 B2 | 1/2005 | Reddy et al. |
| 6,866,048 B2 | 3/2005 | Mattox |
| 6,884,760 B1 | 4/2005 | Brand et al. |
| 6,947,843 B2 | 9/2005 | Fisher et al. |
| 6,989,391 B2 | 1/2006 | Funkhouser |
| 7,086,484 B2 | 8/2006 | Smith |
| 7,098,663 B1 | 8/2006 | Bader |
| 7,210,528 B1 | 5/2007 | Brannon et al. |
| 7,255,169 B2 | 8/2007 | van Batenburg et al. |
| 7,261,158 B2 | 8/2007 | Middaugh et al. |
| 7,281,580 B2 | 10/2007 | Parker et al. |
| 7,281,581 B2 | 10/2007 | Nyuyen et al. |
| 7,326,670 B2 | 2/2008 | DiLullo et al. |
| 7,334,635 B2 | 2/2008 | Nguyen |
| 7,334,636 B2 | 2/2008 | Nguyen |
| 7,344,889 B2 | 3/2008 | Kelemen et al. |
| 7,369,980 B2 | 5/2008 | Deffenbaugh et al. |
| 7,424,911 B2 | 9/2008 | McCarthy et al. |
| 7,451,812 B2 | 11/2008 | Cooper et al. |
| 7,472,751 B2 | 1/2009 | Brannon et al. |
| 7,500,517 B2 | 3/2009 | Looney et al. |
| 7,526,418 B2 | 4/2009 | Pita et al. |
| 7,527,097 B2 | 5/2009 | Patel |
| 7,565,831 B2 | 7/2009 | Miyahara |
| 7,571,767 B2 | 8/2009 | Parker et al. |
| 7,581,590 B2 | 9/2009 | Lesko et al. |
| 7,588,085 B2 | 9/2009 | Acock et al. |
| 7,621,173 B2 | 11/2009 | Hsu |
| 7,645,883 B1 | 1/2010 | Hawkins et al. |
| 7,654,159 B2 | 2/2010 | Enoksson |
| 7,703,531 B2 | 4/2010 | Huang |
| 7,771,549 B1 | 8/2010 | Christe et al. |
| 7,789,164 B2 | 9/2010 | Looney et al. |
| 7,803,740 B2 | 9/2010 | Bicerano et al. |
| 7,857,055 B2 | 12/2010 | Li |
| 7,918,277 B2 | 4/2011 | Brannon et al. |
| 7,921,911 B2 | 4/2011 | Fuller et al. |
| 7,983,845 B2 | 7/2011 | Minh |
| 8,003,212 B2 | 8/2011 | Smith et al. |
| 8,003,577 B2 | 8/2011 | Li et al. |
| 8,006,760 B2 | 8/2011 | Fleming et al. |
| 8,066,068 B2 | 11/2011 | Lesko et al. |
| 8,104,536 B2 | 1/2012 | Looney et al. |
| 8,119,576 B2 | 2/2012 | Reyes et al. |
| 8,127,850 B2 | 3/2012 | Brannon et al. |
| 8,146,416 B2 | 4/2012 | Pisio et al. |
| 8,165,817 B2 | 4/2012 | Betancourt et al. |
| 8,177,422 B2 | 5/2012 | Kjoller et al. |
| 8,205,675 B2 | 6/2012 | Brannon et al. |
| 8,225,866 B2 | 7/2012 | Rouffignac et al. |
| 8,278,931 B2 | 10/2012 | Fang et al. |
| 8,352,228 B2 | 1/2013 | Walters et al. |
| 8,380,437 B2 | 2/2013 | Abousleiman et al. |
| 8,408,305 B2 | 4/2013 | Brannon et al. |
| 8,473,213 B2 | 6/2013 | Zhu et al. |
| 8,490,700 B2 | 7/2013 | Lesko et al. |
| 8,636,065 B2 | 1/2014 | Lesko et al. |
| 8,701,788 B2 | 4/2014 | Wigand et al. |
| 8,729,903 B2 | 5/2014 | Srnka et al. |
| 8,757,259 B2 | 6/2014 | Lesko et al. |
| 8,763,699 B2 | 7/2014 | Medvedev et al. |
| 8,763,703 B2 | 7/2014 | Saini et al. |
| 8,796,187 B2 | 8/2014 | Reyes et al. |
| 8,822,386 B2 | 9/2014 | Quintero et al. |
| 8,835,363 B2 | 9/2014 | Amanullah et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,936,083 B2 | 1/2015 | Nguyen |
| 8,936,089 B2 | 1/2015 | Wigand |
| 9,006,151 B2 | 4/2015 | Amanullah et al. |
| 9,006,153 B2 | 4/2015 | Lin et al. |
| 9,033,043 B2 | 5/2015 | Hinkel |
| 9,057,797 B2 | 6/2015 | Omeragic et al. |
| 9,080,440 B2 | 7/2015 | Panga et al. |
| 9,085,727 B2 | 7/2015 | Litvinets et al. |
| 9,128,210 B2 | 9/2015 | Pomerantz |
| 9,133,398 B2 | 9/2015 | Wigand et al. |
| 9,152,745 B2 | 10/2015 | Glinsky |
| 9,297,244 B2 | 3/2016 | Mahoney et al. |
| 9,523,268 B2 | 12/2016 | Potapenko et al. |
| 9,664,018 B2 | 5/2017 | Vandeponseele et al. |
| 9,670,764 B2 | 6/2017 | Lesko et al. |
| 9,688,904 B2 | 6/2017 | Wang et al. |
| 9,696,270 B1 | 7/2017 | Roy et al. |
| 9,725,645 B2 | 8/2017 | Monastiriotis et al. |
| 9,753,016 B1 | 9/2017 | Daugela |
| 9,784,882 B2 | 10/2017 | Vinegar et al. |
| 9,816,365 B2 | 11/2017 | Nguyen et al. |
| 9,834,721 B2 | 12/2017 | Chang et al. |
| 9,863,211 B2 | 1/2018 | Gamage et al. |
| 9,863,230 B2 | 1/2018 | Litvinets et al. |
| 9,863,231 B2 | 1/2018 | Hull et al. |
| 9,869,649 B2 | 1/2018 | Hull et al. |
| 9,885,691 B1 | 2/2018 | Daugela |
| 9,895,670 B2 | 2/2018 | Anders et al. |
| 9,902,898 B2 | 2/2018 | Nelson et al. |
| 9,909,404 B2 | 3/2018 | Hwang et al. |
| 9,927,344 B2 | 3/2018 | Chertov |
| 9,995,125 B2 | 6/2018 | Madasu et al. |
| 9,995,220 B2 | 6/2018 | Hawie et al. |
| 10,001,769 B2 | 6/2018 | Huang et al. |
| 10,030,495 B2 | 7/2018 | Litvinets et al. |
| 10,047,281 B2 | 8/2018 | Nguyen et al. |
| 10,066,149 B2 | 9/2018 | Li et al. |
| 10,077,396 B2 | 9/2018 | Nguyen et al. |
| 10,113,396 B2 | 10/2018 | Nelson et al. |

(56) References Cited

U.S. PATENT DOCUMENTS

| | | |
|---|---|---|
| 10,151,715 B2 | 12/2018 | Hull et al. |
| 10,273,398 B2 | 4/2019 | Liu et al. |
| 10,329,478 B2 | 6/2019 | Schnoor et al. |
| 10,351,758 B2 | 7/2019 | Hull et al. |
| 10,379,068 B2 | 8/2019 | Hull et al. |
| 2003/0209248 A1 | 11/2003 | Ward |
| 2003/0212465 A1 | 11/2003 | Howard et al. |
| 2004/0211567 A1 | 10/2004 | Aud |
| 2005/0060130 A1 | 3/2005 | Shapiro et al. |
| 2005/0103118 A1 | 5/2005 | Workman |
| 2005/0274523 A1 | 12/2005 | Brannon et al. |
| 2006/0047489 A1 | 3/2006 | Scheidt et al. |
| 2006/0092766 A1 | 5/2006 | Shelley et al. |
| 2006/0265204 A1 | 11/2006 | Wallis et al. |
| 2007/0054054 A1 | 3/2007 | Svoboda et al. |
| 2007/0087940 A1 | 4/2007 | Qu et al. |
| 2007/0203677 A1 | 8/2007 | Awwiller |
| 2007/0235181 A1 | 10/2007 | Lecampion et al. |
| 2007/0298979 A1 | 12/2007 | Perry et al. |
| 2008/0006410 A1 | 1/2008 | Looney et al. |
| 2008/0059140 A1 | 3/2008 | Salmon et al. |
| 2008/0070806 A1 | 3/2008 | Lin et al. |
| 2008/0081771 A1 | 4/2008 | Lin et al. |
| 2008/0093073 A1 | 4/2008 | Bustos et al. |
| 2008/0234147 A1 | 9/2008 | Li et al. |
| 2009/0071239 A1 | 3/2009 | Rojas et al. |
| 2009/0087912 A1 | 4/2009 | Ramos et al. |
| 2009/0143252 A1 | 6/2009 | Lehmann |
| 2009/0193881 A1 | 8/2009 | Finnberg |
| 2009/0242196 A1 | 10/2009 | Pao |
| 2009/0248309 A1 | 10/2009 | Nelville et al. |
| 2009/0253595 A1 | 10/2009 | Qu |
| 2009/0283257 A1 | 11/2009 | Becker |
| 2009/0313772 A1 | 12/2009 | Talley |
| 2010/0010106 A1 | 1/2010 | Crews |
| 2010/0049625 A1 | 2/2010 | Biebesheimer et al. |
| 2010/0051511 A1 | 3/2010 | Faerman |
| 2010/0121623 A1 | 5/2010 | Yogeswaren |
| 2010/0128982 A1 | 5/2010 | Dvorkin et al. |
| 2010/0186520 A1 | 7/2010 | Wheeler |
| 2010/0213579 A1 | 8/2010 | Henry |
| 2010/0224365 A1 | 9/2010 | Abad |
| 2010/0243242 A1 | 9/2010 | Boney et al. |
| 2010/0258265 A1 | 10/2010 | Karanikas et al. |
| 2010/0263867 A1 | 10/2010 | Horton et al. |
| 2010/0276142 A1 | 11/2010 | Skildum et al. |
| 2010/0279136 A1 | 11/2010 | Bonucci |
| 2011/0065612 A1 | 3/2011 | Stokes et al. |
| 2011/0257944 A1 | 10/2011 | Du et al. |
| 2011/0259588 A1 | 10/2011 | Ali |
| 2012/0018159 A1 | 1/2012 | Gulta et al. |
| 2012/0026037 A1 | 2/2012 | Thomson et al. |
| 2012/0129737 A1 | 5/2012 | Lesko et al. |
| 2012/0179444 A1 | 7/2012 | Ganguly et al. |
| 2012/0193578 A1 | 8/2012 | Pan et al. |
| 2012/0247774 A1 | 10/2012 | Li et al. |
| 2012/0261129 A1 | 10/2012 | Becker |
| 2012/0261617 A1 | 10/2012 | Pan et al. |
| 2012/0267102 A1 | 10/2012 | Huang et al. |
| 2012/0318498 A1 | 12/2012 | Parsche |
| 2013/0013209 A1 | 1/2013 | Zhu et al. |
| 2013/0056213 A1 | 3/2013 | Medvedev et al. |
| 2013/0084643 A1 | 4/2013 | Commarieu et al. |
| 2013/0137610 A1 | 5/2013 | Huang |
| 2013/0160994 A1 | 6/2013 | Alsop et al. |
| 2013/0161002 A1 | 6/2013 | Wigand |
| 2013/0213120 A1 | 8/2013 | Lebedev |
| 2013/0213638 A1 | 8/2013 | Keller |
| 2013/0228019 A1 | 9/2013 | Meadows |
| 2013/0231908 A1 | 9/2013 | Williams et al. |
| 2013/0233536 A1 | 9/2013 | Alqam |
| 2013/0238304 A1 | 9/2013 | Glinsky |
| 2013/0269933 A1 | 10/2013 | Pomerantz et al. |
| 2013/0275099 A1 | 10/2013 | Frydman |
| 2014/0008305 A1 | 1/2014 | Nichols et al. |
| 2014/0027109 A1 | 1/2014 | Al-Baraik |
| 2014/0045732 A1 | 2/2014 | Mazyar |
| 2014/0048694 A1 | 2/2014 | Pomerantz |
| 2014/0090850 A1 | 4/2014 | Benicewicz |
| 2014/0096964 A1 | 4/2014 | Chakraborty et al. |
| 2014/0116710 A1 | 5/2014 | Naser-El-Din et al. |
| 2014/0221257 A1 | 8/2014 | Roddy |
| 2014/0231077 A1 | 8/2014 | Rivero et al. |
| 2014/0243246 A1 | 8/2014 | Hendrickson |
| 2014/0247997 A1 | 9/2014 | Nishyama |
| 2014/0251605 A1 | 9/2014 | Hera |
| 2014/0260694 A1 | 9/2014 | Szlendak |
| 2014/0364343 A1 | 12/2014 | Nelson et al. |
| 2014/0367100 A1 | 12/2014 | Oliveria et al. |
| 2014/0374104 A1 | 12/2014 | Kushal |
| 2014/0374108 A1 * | 12/2014 | Vandeponseele ....... E21B 43/26 166/308.2 |
| 2015/0019183 A1 | 1/2015 | Suzuki |
| 2015/0055438 A1 | 2/2015 | Yan et al. |
| 2015/0057097 A1 | 2/2015 | Cho |
| 2015/0057196 A1 | 2/2015 | Debord |
| 2015/0065398 A1 | 3/2015 | Gartland et al. |
| 2015/0075782 A1 | 3/2015 | Sharma |
| 2015/0083405 A1 | 3/2015 | Dobroskok |
| 2015/0152724 A1 | 6/2015 | Amendt |
| 2015/0167440 A1 | 6/2015 | Kasevich |
| 2015/0192005 A1 | 7/2015 | Saeedfar |
| 2015/0259593 A1 | 9/2015 | Kaufman et al. |
| 2015/0284625 A1 | 10/2015 | Silveira |
| 2015/0293256 A1 | 10/2015 | Dusterhoft |
| 2015/0322759 A1 | 11/2015 | Okoniewski |
| 2016/0103047 A1 | 4/2016 | Liu |
| 2016/0103049 A1 | 4/2016 | Liu |
| 2016/0130496 A1 | 5/2016 | Holtsclaw et al. |
| 2016/0137904 A1 | 5/2016 | Drake |
| 2016/0152882 A1 * | 6/2016 | Eriksen ................... C02F 1/008 507/140 |
| 2016/0177674 A1 | 6/2016 | Shetty et al. |
| 2016/0215202 A1 | 7/2016 | Weaver et al. |
| 2016/0215205 A1 | 7/2016 | Nguyen |
| 2016/0256583 A1 | 9/2016 | Yamada |
| 2016/0265331 A1 | 9/2016 | Weng et al. |
| 2016/0362965 A1 | 12/2016 | Parlar |
| 2017/0015895 A1 | 1/2017 | Cox |
| 2017/0051598 A1 | 2/2017 | Ouenes |
| 2017/0066959 A1 | 3/2017 | Hull et al. |
| 2017/0066962 A1 | 3/2017 | Ravi et al. |
| 2017/0067836 A1 | 3/2017 | Hull et al. |
| 2017/0137703 A1 | 5/2017 | Leverson et al. |
| 2017/0145303 A1 | 5/2017 | Fontenelle et al. |
| 2017/0145793 A1 | 5/2017 | Ouenes |
| 2017/0198207 A1 | 7/2017 | Li et al. |
| 2017/0275525 A1 | 9/2017 | Koep et al. |
| 2017/0328179 A1 | 11/2017 | Dykatra et al. |
| 2017/0336528 A1 | 11/2017 | Badri et al. |
| 2017/0370197 A1 | 12/2017 | Han et al. |
| 2018/0112126 A1 | 4/2018 | Yang et al. |
| 2018/0155602 A1 | 6/2018 | Zhang |
| 2018/0195982 A1 | 7/2018 | Hull et al. |
| 2018/0355707 A1 | 12/2018 | Herrera et al. |
| 2019/0078424 A1 | 3/2019 | Copeland et al. |
| 2019/0211658 A1 | 7/2019 | Hull et al. |

FOREIGN PATENT DOCUMENTS

| | | |
|---|---|---|
| CN | 1621803 | 5/2012 |
| CN | 103387827 | 11/2013 |
| CN | 102183410 | 5/2014 |
| CN | 104727799 | 6/2015 |
| CN | 105445440 | 3/2016 |
| EP | 247669 | 12/1987 |
| EP | 2480625 | 4/2013 |
| EP | 2480626 | 4/2013 |
| WO | 1997028098 | 8/1997 |
| WO | 2000060379 | 10/2000 |
| WO | 2001094749 | 12/2001 |
| WO | 2002064702 | 8/2002 |
| WO | 2004005435 | 1/2004 |
| WO | 2007098370 | 8/2007 |

(56) References Cited

FOREIGN PATENT DOCUMENTS

| WO | 2008001218 | 1/2008 |
|---|---|---|
| WO | 2010138914 | 12/2010 |
| WO | 2011035292 | 3/2011 |
| WO | 2011035294 | 3/2011 |
| WO | 2012051647 | 4/2012 |
| WO | 2012057910 | 5/2012 |
| WO | 2012087887 | 6/2012 |
| WO | 2012087898 | 6/2012 |
| WO | 2012088476 | 6/2012 |
| WO | 2012104582 | 8/2012 |
| WO | 2012122505 | 9/2012 |
| WO | 2012171857 | 12/2012 |
| WO | 2013052359 | 4/2013 |
| WO | 2013112114 | 8/2013 |
| WO | 2013149122 | 10/2013 |
| WO | 2013155061 | 10/2013 |
| WO | 2014008598 | 1/2014 |
| WO | 2014123672 | 8/2014 |
| WO | 2015041664 | 3/2015 |
| WO | 2015071750 | 5/2015 |
| WO | 2015097116 | 7/2015 |
| WO | 2015126082 | 8/2015 |
| WO | 2015163858 | 10/2015 |
| WO | 2015181028 | 12/2015 |
| WO | 2015200060 | 12/2015 |
| WO | 2016094153 | 6/2016 |
| WO | 2017035371 | 3/2017 |
| WO | 2017040824 | 3/2017 |
| WO | 2017040834 | 3/2017 |
| WO | 2017086975 | 5/2017 |
| WO | 2017136641 | 8/2017 |
| WO | 2018025010 | 2/2018 |
| WO | 2019140058 | 7/2019 |

OTHER PUBLICATIONS

U.S. Appl. No. 15/243,312, filed Aug. 22, 2016, Chen.
Abad et al., "Evaluation of the Material Properties of the Multilayered Oxides formed on HCM12A using New and Novel Techniques," Manuscript Draft, Manuscript No. OXID-D-15-00019, published in 2015, 44 pages.
Abass et al., "Wellbore Instability of Shale Formation, Zuluf Field, Saudi Arabia," presented at the SPE Technical Symposium on Saudi Arabia Section, Dhahran, Saudi Arabia, May 21-23, 2006, 10 pages.
Abouseliman et al., "The granular and polymer composite nature of kerogen-rich shale," Acta Geotechnica, vol. 11, No. 3, Feb. 2016, 22 pages.
Abousleiman and Nguyen, "Poromechanics Response of Inclined Wellbore Geometry in Fractured Porous Media," Journal of Engineering Mechanics, ASCE, Nov. 2005, 14 pages.
Abousleiman et al, "A Micromechanically Consistent oroviscoelasticity Theory for Rock Mechanics Applications," Int. J. Rock Mech. Min. Sci. & Geomech. Abstr., vol. 30, No. 7, published in 1993, 4 pages.
Abousleiman et al, "Anisotropic Porothermoelastic Solution and Hydro-Thermal Effects on Fracture Width in Hydraulic Fracturing," Int. J. Numer, Anal. Meth, Geomech., published in 2013, 25 pages.
Abousleiman et al, "Poroviscoelastic Analysis of Borehole and Cylinder Problems," ACTA Mechanica, vol. 119, published in 1996, 21 pages.
Abousleiman et al, "SPE 110120: Geomechanics Field and Laboratory Characterization of Woodford Shale: The Next Gas Play," SPE International, SPE 110120, presented at the 2007 SPE Annual Technical Conference and Exhibition on Nov. 11-14, 2007, 14 pages.
Abousleiman et al, "The Granular and Polymer Nature of Kerogen Rich Shale," Acta Geotechnica 2016, 11 (3), pp. 573-594, 22 pages.
Abousleiman et al., "GeoGenome Industry Consortium (G2IC)," JIP, 2004-2006, 6 pages.
Abousleiman et al., "Geomechanics field characterization of Woodford Shale and Barnett Shale with advanced logging tools and nano-indentation on drill cuttings," The Leading Edge, Jun. 2010, 6 pages.

Abousleiman et al., "Mandel's Problem Revisited," Geotechnique, 46, No. 2, published in 1996, 9 pages.
Abousleiman et al., "Mechanical Characterization of Small Shale Samples subjected to Fluid Exposure using the Inclined Direct Shear Testing Device," Int. J. Rock Mech. & Min. Sci., vol. 47, No. 3, published in 2010, 13 pages.
Abousleiman et al., "Modeling Real-Time Wellbore Stability within the Theory of Poromechanics," AADE-03-NTCE-11, presented at the AADE 2003 National Technology Conference, Practical Soultions for Drilling Challenges, Texas, Apr. 1-3, 2003, 14 pages.
Abousleiman et al., "Poroelastic Solutions in Transversely Isotropic Media for Wellbore and Cylinder," Int. J. Solids Structures, vol. 35, Nos. 34-35, published in 1998, 25 pages.
Abousleiman et al., "SPE 124428: GeoMechanics Field Characterization of the Two Prolific U.S. Mid-West Gas Plays with Advanced Wire-Line Logging Tools," SPE International, presented at the 2009 SPE Annual Technical Conference and Exhibition, Oct. 4-7, 2009, 19 pages.
Abousleiman et al., "Time-Dependent wellbore (in)stability predictions: theory and case study," IADC/SPE 62796, presented at the 2000 IADC/SPE Asia Pacific Drilling Technology held in Kuala Lumur, Malaysia, Sep. 11-13, 2000, 8 pages.
Agenet et al., "SPE 157019: Fluorescent Nanobeads: a First Step Toward Intelligent Water Tracers," Society of Petroleum Engineers, SPE International Oilfield Nanotechnology conference, Jun. 12-14, 2012, 13 pages.
Agilent "Field-Deployable Solution for Nanoporosity Measurements in Mud Logging Operations and a Novel Method for Fracability Analysis Using Mud Cuttings," Agilent Technologies, Oct. 2013, 44 pages.
Ahmed et al. "7.2.2 Information Required to Move to a Pilot Project," Unconventional Resources Exploitation and Development, 2016, 1 page.
Allan et al., "A Multiscale Methodology for the Analysis of Velocity Anisotropy in Organic-Rich Shale," Geophysics, vol. 80, No. 4, Jul.-Aug. 2015, 16 pages.
Al-Munthasheri, "A Critical Review of Hydraulic Fracturing Fluids over the Last Decade," SPE 169552, presented at the SPE Western North American and Rocky Mountain Joint Regional Meeting, Apr. 16-18, 2014, 25 pages.
Altowairqi, "Shale elastic property relationships as a function of total organic carbon content using synthetic samples," Journal of Petroleum Science and Engineering vol. 133, Sep. 2015, 9 pages.
Ananthan et al., "Influence of Strain Softening on the Fracture of Plain Concrete Beams," Int. J. of Fracture, vol. 45, published in 1990, 25 pages.
Anisimov, "SPE 118862: The Use of Tracers for Reservoir Characterization," Society of petroleum Engineers (SPE), presented at SPE Middle East Oil and Gas Show and Conference, Mar. 15-18, 2009, 8 pages.
Arns et al: "Computation of linear elastic properties from microtomographic images: Methodology and agreement between theory and experiment", Geophysics, vol. 67, No. 5, Sep. 1, 2002, pp. 1396-1405, 10 pages.
Aslan et al., "Fluorescent Core—Shell AG@$SiO_2$ Nanocomposites for Metal-Enhanced Fluorescence and Single Nanoparticle Sensing Platforms," Jan. 19, 2007, 2 pages.
Ballice, "Solvent Swelling Studies of Goynuk (Kerogen Type-I) and Beypazari Oil Shales (Kerogen Type-II)," Science Direct, Fuel vol. 82, published in 2003, 5 pages.
Barati and Liang, "A Review of Fracturing Fluid Systems Used for Hydraulic Fracturing of Oil and Gas Wells," Journal of Applied Polymer Science, vol. 131, Issue 16, Aug. 15, 2014, 11 pages.
Barenblatt et al., "Basic Concepts in the Theory of Seepage of Homogeneous Liquids in Fissured Rocks (Strata)," PMM vol. 24, No. 5, 1960, 18 pages.
Bazant et al., "Deformation of Progressively Cracking Reinforced Concrete Beams," ACI Journal, Technical Paper, Title No. 81-26, vol. 81, No. 3, May-Jun. 1984, 11 pages.
Bazant et al., "Size Effect in Brazilian Split-Cylinder Tests: Mesurements and Fracture Analysis," ACI Materials Journal, vol. 88, No. 3, May 31, 1991; pp. 325-332.

(56) References Cited

OTHER PUBLICATIONS

Bazant et al., "Strain-Softening Bar and Beam: Exact Non-Local Solution," Int. J. Solids Structures, vol. 24, No. 7, published in 1988, 15 pages.

Bennett et al., "Instrumented Nanoindentation and 3D Mechanistic Modeling of a Shale at Multiple Scales," Acta Geotechnica, vol. 10, No. 21, Jan. 9, 2015; 14 pages.

Berryman, "Extension of Poroelastic Analysis to Double-Porosity Materials: New Technique in Microgeomechanics," Journal of Eng Mech., vol. 128, No. 8, 2002, 8 pages.

Bhandari et al., "Two-Dimensional DEM Analysis of Behavior of Geogrid-Reinforced Uniform Granular Bases under a Vertical Cyclic Load, Acta Geotechnica," published in 2014, 12 pages.

Biot et al., "Temperature analysis in hydraulic fracturing," Journal of Petroleum Technology, vol. 39, No. 11, Nov. 1987, 9 pages.

Biot, "General Theory of Three-Dimensional Consolidation," Journal of Applied Physics, vol. 12, No. 2, Feb. 1941, 11 pages.

Bisnovat et al., "Mechanical and petrophysical behavior of organic-rich chalk from the Judea Plains, Israel," Marine and Petroleum Geology, vol. 64, Jun. 2015, 13 pages.

Bobko et al., "The Nanogranular Origin of Friction and Cohesion in Shale—A Strength Homogenization Approach to Interpretation of Nanoindentation Results," Int. J. Numer. Anal. Meth. Geomech., published in 2010, 23 pages.

Boskey et al., "Perspective—Collagen and Bone Strength," Journal of Bone and Mineral Research, vol. 14, No. 3, published in 1999, 6 pages.

Bratton et al., "The Nature of Naturally Fractured Reservoirs," June Oilfield Review, 2006, 21 pages.

Brochard et al., "Fracture Properties of Kerogen and Importance for Organic-Rich Shales," Annual World Conference on Carbon (Carbon 2013), Jul. 2013, 5 pages.

Bunzil et al., "Taking advantage of luminescent lanthanide ions," Chemical Society Reviews, Dec. 2005, 29 pages.

Caenn et al., "Chapter 9: Wellbore Stability," p. 359, in Composition and Properties of Drilling and Completion Fluids, 7th Edition: Gulf Professional Publishing, 2016, 1 page.

Cahill et al., "Nanoscale Thermal Transport II," Applied Physics Reviews 1.1, 2014, 46 pages.

California Council on Science and Technology Lawrence Berkeley National Laboratory Pacific Institute, "Advanced Well Stimulation Technologies in California: An Independent Review of Scientific and Technical Information," CCST, Jul. 2016, 400 pages.

Carcione and Avseth, "Rock-physics templates for clay-rich source rocks," Geophysics vol. 80, Issue 5, D481-D500, Sep. 2015, 21 pages.

Carter and Hanson, "Fake Moon Dirt, HOOD Solar System Science," UT Dallas Magazine, vol. 6, Issue 2, Spring 2016, 1 page.

Chang et al., "Magnetic SERS Composite Nanoparticles for Microfluidic Detection," 251st ACE National Meeting, Mar. 13-17, 2016, 1 pages.

Chang, "In-Situ Formation of Proppant and Highly Permeable Blocks for Hydraulic Fracturing," SPE Hydraulic Fracturing Technology Conference 2015.

Chen et al., "Size Effect in Micro-Scale Cantilever Beam Bending," Acta Mech., published in 2011, 17 pages.

Chen et al., "FITC functionalized magnetic core-shell $Fe_3O_4/Ag$ hybrid nanoparticle for selective determination of molecular biothiols," Elsevier Ltd., Dec. 2013, 7 pages.

Chern et al., "Deformation of Progressively Cracking Partially Prestressed Concrete Beams," PCI Journal, vol. 37, No. 1, published in 1992, 11 pages.

Cheshomi et al., "Determination of uniaxial compressive strength of microcystalline limestone using single particles load test," Journal of Petroleum Science and Engineering, vol. 111, 2013, 6 pages.

Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.

Chupin et al., "Finite Strain Analysis of Nonuniform Deformation Inside Shear Bands in Sands," Int. J. Numer. Anal. Meth. Geomech., published in 2012, 16 pages.

Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

Cubillos et al., "SPE 174394-MS: The Value of Inter-well and Single Well Tracer Technology for De-Risking and Optimizing a CEOR Process—Caracara Field Case," Society of Petroleum Engineers (SPE), presented at EUROPEC 2015, Jun. 1-4, 2015, 19 pages.

Cui et al., "Poroelastic Solution for an Inclined Borehole," Transactions of the ASME, vol. 64, Mar. 1997, 7 pages.

Custelcean et al., "Aqueous Sulfate Separation by Crystallization of Sulfate-Water Clusters," Angew. Chem. Int. Ed., published in 2015, vol. 54, pp. 10525-10529.

Dagan, "Models of Groundwater Flow in Statistically Homogeneous Porous Formations," Water Resource Res. vol. 15, Feb. 1979, 17 pages.

Daneshy, "Hydraulic Fracturing to Improve Production," Tech 101, TheWayAhead, vol. 6, No. 3, Oct. 2010, 4 pages.

Das et al., "Molecular Fluorescence, Phosphorescence, and Chemiluminescence Spectrometry," Analytical Chemistry, Nov. 3, 2011, 29 pages.

De Block et al., "SPE-177601-MS: A New Solution for the Characterization of Unconventional Shale Resources Based on Analysis or Drill Cutting," SPE International, presented at the Abu Dhabi International Petroleum Exhibition and Conference, Nov. 9-12, 2015, 6 pages.

De Rocha et al., "Concentrated CO2-in-Water Emulsions with Nonionic Polymeric Surfactants," J. Colloid Interface Sci. 2001 239 (1), pp. 241-253, 13 pages.

Deans, "SPE 7076: Using Chemical Tracers To Measure Fractional Flow And Saturation In-Situ," Society of Petroleum Engineers (SPE), presented at SPE Symposium on improved Methods of Oil Recovery, Apr. 16-17, 1978, 10 pages.

Deirieh et al., "Nanochemomechanical Assessment of Shale: A Coupled WDS-Indentation Analysis," Acta Geotechnica, published in 2012, 25 pages.

Delafargue and Ulm, "Explicit approximations of the indentation modulus of elastically orthotropic solids for conical indenters," International Journal of Solids and Structures vol. 41, Issue 26, Dec. 2004, 10 pages.

Detournay and Cheng, "Poroelastic Response of a Borehole in a Non-Hydrostatic Stress Field," International Journal of Rock Mechanics, Min. Science and Geomech. Abstracts, vol. 25, No. 3, 1988, 12 pages.

Devarapalli et al., "Micro-CT and FIB-SEM imaging and pour structure characterization of dolomite rock at multiple scales," Arabian Journal of Geosciences, Aug. 2017, 9 pages.

Du et al., "SPE 93140: Interwell Tracer Tests: Lessons Learnted from past Field Studies," Society of Petroleum Engineers (SPE), presented at SPE Asia Pacific Oil and Gas Conference and Exhibition, Apr. 5-7, 2005, 9 pages.

Eastoe et al., "Water-in-CO2 Microemulsions Studied by Small-Angle Neutron Scattering," Langmuir 1997, 13(26), pp. 6980-6984, 5 pages.

Ehlig-Economides and Economides, "Water as Poppant," SPE-147603, presented at the SPE Annual Technical Conference and Exhibition, Oct. 30-Nov. 2, 2011, 8 pages.

Ekbote et al., "Porochemoelastic Solution for an Inclided Borehole in a Transversely Isotropic Formation," J. of Eng. Mech., ASCE, Jul. 2006, 10 pages.

El-Aneed et al., "Mass Spectrometry, Review of the Basics: Electrospray, MALDI, and Commonly Used Mass Analyzers," Applied Spectroscopy Reviews, Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

(56) References Cited

OTHER PUBLICATIONS

Eliyahu et al., "Mechanical Properties of organic matter in shales mapped at the nanometer scale", Marine and Petroleum Geology, vol. 59, pp. 294-304, Sep. 18, 2014, 11 pages.

Ertas et al., "Petroleum Expulsion Part 1. Theory of Kerogen Swelling in Multicomponent Solvents," Energy & Fuels, published in 2006, 6 pages.

Eseme et al., "Review of mechanical properties of oil shales: implications for exploitation and basin modeling," Oil Shale, vol. 24, No. 2, Jan. 2007, 16 pages.

Esfahani et al., "Quantitative nanoscale mapping of three-phase thermal conductivities in filled skutterudites via scanning thermal microscopy," Nature Science Review, vol. 5, Issue 1, Feb. 2017, 31 pages.

Ewy, "Shale Swelling/Shrinkage and Water Content Change due to Imposed Suction and Due to Direct Brine Contact," Acta Geotechnica, published in 2014, 18 pages.

Ewy, "Wellbore-Stability Predictions by Use of a Modefied Lade Criterion," SPE Drill and Completion, vol. 14, No. 2, Jun. 1999, 7 pages.

fekete.com [online], "Dual Porosity," retrieved from URL <www.fekete.com/SAN/WebHelp/FeketeHarmony/Harmony_WebHelp/Content/HTML_Files/Reference_Material/General_Concepts/Dual_Porosity.htm>, available on or before 2014, retrieved on Nov. 11, 2019, 6 pages.

Fjaer et al., "Stresses around Boreholes. Borehole Failure Criteria," in Petroleum Related Rock Mechanics, 2nd Edition, Elsevier Science, 2008, p. 156, 1 page.

Frazer et al., "Localized Mechanical Property Assessment of SiC/SiC Composite Materials," Science Direct, Part A 70, published in 2015, 9 pages.

Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.

Gandossi and Estorff, "An overview of hydraulic fracturing and other formation stimulation technologies for shale gas production," JRC Science for Policy Report, European Commission, EUR 26347 EN, Jan. 2013, 62 pages.

Ganjdanesh et al. "Treatment of Condensate and Water Blocks in Hydraulic-Fractured Shale-Gas/Condensate Reservoirs," SPE-175145, presented at the SPE Annual Technical Conference and Exhibition, Sep. 28-30, 2015, published in SPE Journal, Apr. 2016, 10 pages.

Gao et al., "Materials Become Insensitive to Flaws at Nanoscale: Lessons from Nature," PNAS, vol. 100, No. 10, May 13, 2003, 628 pages.

Gardiner et al., "Practical Raman Spectroscopy," Springer-Verlag, 1989, 9 pages.

Garnero, "The Contribution of Collagen Crosslinks to Bone Strength," Int. Bone & Mineral Society, Sep. 2012, 8 pages.

George et al.; Approximate relationship between frequency-dependent skin depth resolved from geoelectronnagnetic pedotransfer function and depth of investigation resolved from geoelectrical measurements: A case study of coastal formation, southern Nigeria; Oct. 2016; J. Earth Syst. Sci.; 1379-1390 (Year: 2016).

Georgi et al., "Physics and Chemistry in Nanoscale Rocks", Mar. 22-26, 2015, La Jolla, California, USA, SPE Forum Series; 4 pages.

Glossary.oilfield.slb.com' [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.

Glover et al., "ARMA 16-0737: The Use of Measurements Made on Drill Cuttings to Construct and Apply Geomechanical Well Profiles," ARMA, presentation at the 50th US Rock Mechanics/Geomechanics Symposium, Jun. 26-29, 2016, 11 pages.

Golomb et al., "Macroemulsion of liquid and supercritical CO2-in-water and water-in-liquid CO2 stabilized with fine particles," Ind. Eng. Chem. Res. 2006, 45(8), pp. 2728-2733, 6 pages.

Goodman, "Introduction to Rock Mechanics," John Wiley & Sons, Chapter 3: Rock Strength and Failure Criteria; 21 pages.

Gu and Mohanty, "Effect of Foam Quality on Effectiveness of Hydraulic Fracturing in Shales," International Journal of Roch Mechanics and Mining Sciences, vol. 70, 2014, 13 pages.

Han et al., "LBM-DEM Modeling of Fluid-Solid Interaction in Porous Media," Int. J. Numer. Anal. Meth. Geomech., published in 2013, 17 pages.

Han et al., "Numerical and Experimental Studies of Kerogen Rich Shales on Millimeter-Scale Single-Edge Notched Beam," prepared for presentation at the 53rd US Rock Mechanics and Geomechanics Symposium in New York, Jun. 23-26, 2019, 8 pages.

Han et al., "Numerical Modeling of Elastic Hemispherical Contact for Mohr-Coulomb Type Failures in Micro-Geomaterials," Experimental Mechanics, vol. 57, Jun. 16, 2017, 15 pages.

Han et al., "Application of Silver-Coated Magnetic Microspheres to a SERS-Based Optofluidic Sensor," The Journal of Physical Chemistry (JPCC), Mar. 7, 2011, 7 pages.

Harrison et al., "Water-in-Carbon Dioxide Microemulsions with a Fluorocarbon-Hydrocarbon Hybrid Surfactant," Langmuir 1994, 10(10), pp. 3536-3541, 6 pages.

Hiramatsu and Oka, "Stress around a shaft or level excavated in ground with a three-dimensional stress state," Mem. Fra. Eng. Kyotu Univ. vol. 24, 1962, 2 pages Abstract.

Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, vol. 112, Aug. 30, 2012; 16 pages.

Hoek and Brown, "Empirical Strength Criterion for Rock Masses," Journal of the Geotechnical Engineering Division, Sep. 1980, 20 pages.

Hornby et al., "Anisotropic Effective-Medium Modeling of the Elastic Properties of Shales," Geophysics, vol. 59, No. 10, Oct. 1994, 14 pages.

Hosemann et al., "Mechamcal Characteristics of SiC Coating Layer in TRISO Fuel Particles," Journal of Nuclear Materials, vol. 442, published in 2013, 10 pages.

Hosemann et al., "An Exploratory Study to Determine Applicability of Nano-Hardness and Micro-compression Measurments for Yield Stress Estimation," Science Direct, published in 2008, 9 pages.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, Nov. 27, 2014, 10 pages.

Hull and Abousleiman, "New Frontiers in Oil and Gas Exploration," Chapter 10: Insights of the Rev of Source Shale from Nano- and Micromechanics, Springer International Publishing Switzerland, 2016, 29 pages.

Hull et al, "Nanomechanical Characterization of the Tensile Modulus of Rupture of Kerogen-Rich Shale," SPE Journal 2017, 22 (4), pp. 1024-1033, 10 pages.

Hull et al, "Recent Advances in Viscoelastic Surfactants for improved Production from Hydrocarbon Reservoirs," SPE Journal, 2016.

Huseby et al., "SPE-169183-MS: High Quality Flow Information from Tracer Data," Society of Petroleum Engineers (SPE), presented at the SPE Bergen One Day Seminar, Apr. 2, 2014, 9 pages.

Hutchins et al., "SPE-21049: Aqueous Tracers for Oilfield Applications," Society of Petroleum Engineers (SPE), presented at SPE International Symposium on Oilfield Chemistry, Feb. 20-22, 1991, 9 pages.

Hydraulic Fracturing Fluid Product Component Information Disclosure; 2 pages.

Iqbal et al., "In situ micro-cantilver tests to study fracture properties of NiAl single crystals," Acta Materialia, vol. 60, No. 3, Feb. 2012; 8 pages.

Itasca "Three-dimensional Fast Lagrangian Analysis of Continua (FLAC3D)," available on or before 2012, [retrieved on Jun. 7, 2018], retrieved from URL: < https://www.itascacg.com/software/flac3d>, 4 pages.

itascacg.com' [online], "Particle Flow Code, Version 5.0," Itasca Consulting Group, Inc., available on or before Apr. 11, 2014,

(56) References Cited

OTHER PUBLICATIONS

[retrieved on May 11, 2018], retrieved from URL: <https://www.itascacg.com/software/pfc>, 5 pages.

Iyengar et al., "Analysis of Crack Propagation in Strain-Softening Beams," Engineering Fracture Mechanics, published in 2002, 18 pages.

Jaeger et al., "Fundamentals of Rock Mechanics," 4th Edition, Wiley, 2007, 486 pages.

Jia et al., "Highly Efficient Extraction of Sulfate Ions with a Tripodal Hexaurea Receptor," Angew. Chem. Int. Ed., published in 2011, vol. 50, pp. 486-490.

Jianhong et al., "Estimation of the Tensile Elastic Modulus using Brazilian disc by Applying Diametrically Opposed Concentrated Loads," International Journal of Rock Mechanics & Mining Sciences, vol. 46, No. 3, published in 2009, 568-576.

Johnston et al, "Water-in-Carbon Dioxide Microemulsions: An Environment for Hydrophiles Including Proteins," Science, vol. 271, issue 5249, pp. 624-626, Feb. 2, 1996, 3 pages.

Jose et al., "Continuous multi cycle nanoindentation studies on compositionally graded $Ti_{1-x}Al_xN$ multilayer thin films," (XP028230250) Materials Science and Engineering: A, Elsevier, vol. 528, No. 21, Apr. 20, 2011; 7 pages.

Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels, published in 2006, 8 pages.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Kim et al., "Numerical analysis of fracture propagation during hydraulic fracturing operations in shale gas systems," International Journal of Rock and Mechanics Mining Sciences vol. 76, 2015.

King, "Thirty Years of Gas Shale Fracturing: What Have We Learned?" SPE-133456, presented at the SPE Annual Technical Conference and Exhibition, Sep. 19-22, 2010, 50 pages.

Klapetek, "Chapter 11: Thermal Measurements," Quantitative Data Processing in Scanning Probe Microscopy: SPE Applications for Nanometrology, 2018, 26 pages.

Kneipp et al., "Single Molecule Detection Using Surface-Enhanced Raman Scattering (SERS)," Physical Review Letters, American Physical Society vol. 78, No. 9, Mar. 3, 1997, 4 pages.

Kolymbas, "Kinematics of Shear Bands," Acta Geotechnica, published in 2009, 4 pages.

Kumar et al., "SPE 159804: Nano to Macro Mechanical Characterization of Shale," SPE International, presented at the SPE Annual Technical Conference and Exhibition, Oct. 8-10, 2012, 23 pages.

Kuperkar et al., "Visoelastic micellar water/CTAB/NaNO3 Solutions: Reology, SANS and cyro-TEM Analysis," Journal of Colloid and Interface Science, vol. 323, 403-409, 2008, 7 pages.

Lam et al., "Experiments and Theory in Strain Gradient Elasticity," J. Mech. And Phys. Of Solids, published in 2003, 32 pages.

Larsen et al., "Changes in the Cross-Link Density of Paris Basin Toarcian Kerogen During Maturation," Organic Geochemistry, published in 2002, 10 pages.

Laurent Brochard et al.; "Fracture Properties of Kerogen and Importance for Organic-Rich Shales"; Annual World Conference on Carbon (Carbon 2013), Jul. 2013, Rio de Janeiro, Brazil. HAL ID: hal-01274161, 6 pages.

Lee et al., "water-in carbon dioxide emulsions: Formation and stability" Langmuir, 1999, 15(20), pp. 6781-6791, 11 pages.

Li et al., "A review of crosslinked fracturing fluids prepared with produced water," Petroleum 2, vol. 2, Issue 4, Dec. 2016, 11 pages.

Li et al., "Differentiating Open Natural Fractures from Healed Fractures Using the New, High-Definition Oil-Based Mud Microelectrical Imager-Case Studies from Organic Rich Shales," presented at the SPE Annual Technical Conference and Exhibition held in Houston, Texas, Sep. 28-30, 2015, 16 pages.

Li et al., "High-Temperature Fracturing Fluids Using Produced Water with Extremely High TDS and Hardness," IPTC-17797-MS, Dec. 2014, 13 pages.

Li et al., "Mechanical Characterization of Micro/Nanoscale Structures for MEMS/NEMS Applications using Nanoindentation Techniques," Science Direct, published in 2003, 775 pages.

Li et al., "The Brazilian Disc Test for Rock Mechanics Applications: Review and New Insights," Rock Mech Rock Eng, published in 2013, 46: pp. 269-287.

Li et al., "Well Treatment Fluids Prepared With Oilfield Produced Water: Part II," SPE-133379-MS, Sep. 2010, 7 pages.

Liang et al., "An Experimental Study on interactions between Imbibed Fractured Fluid and Organic-Rich Tight Carbonate Source Rocks," SPE-188338-MS, Abu Dhabi International Petroleum Exhibition and Conference, Nov. 13-16, 2017, 14 pages.

Liu and Abousleiman, "Effects of Mudcake and Formation N-Porosity N-Permeability on Wellbore Stability," SPE Journal, Oct. 2018, 25 pages.

Liu and Abousleiman, "Multiporosity/Multipermeability Inclined-Wellbore Solutions with Mudcake Effects," SPE Journal vol. 23, No. 5, Oct. 2018, 25 pages.

Liu and Abousleiman, "N-Porosity and N-Permeability generalized wellbore stability analytical solutions and applications," presented at the 50th US Rock Mechanics/Geomechanics Symposium held in Houston, Texas, Jun. 26-29, 2016, 10 pages.

Liu and Abousleiman, "Poroelastic Dual-Porosity/Dual-Permeability After-Closure Pressure-Curves Analysis in Hydraulic Fracturing," SPE Journal 2016, 21 pages.

Liu et al., "Applications of nano-indentation methods to estimate nanoscale mechanical properties of shale reservoir rocks," Journal of Natural Gas Science and Engineering, Elsevier, Amsterdam, NL, vol. 35, Sep. 29, 2016, 10 pages.

Liu et al., "Microstructural and geomechanical analysis of Bakken shale at nanoscale," Journal of Petroleum Science and Engineering, vol. 153, Mar. 23, 2017, 12 pages.

Liu et al., "Safe Drilling in Chemically Active and Naturally Fractured Source Rocks: Analytical Solution and Case Study," Society of Petroleum Engineers/IADC, IADC/SPE Drilling Conference and Exhibition, Fort Worth Texas, Mar. 6-8, 2018.

Liu, "Dimension effect on mechanical behavior of silicon micro—cantilver beams," Measurement, vol. 41, No. 8, Oct. 2008; 11 pages.

Liu, "Elastic Constants Determination and Deformation Observation Using Brazilian Disk Geometiy," Experimental Mechanics, published in 2010, 50: pp. 1025-1039.

Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu, "Micro—cantilver Testing to Evaluate the Mechanical Properties of Thermal Barrier Coatings," 19th European Conference on Fracture (ECF19): Fracture Mechanics for Durability, Reliability and Safety; Conference Proceedings held Aug. 26-31, 2012, Kazan, Russia; 7 pages.

Long et al., "Chapter Two: Advanced Well Stimulation Technologies," in An Independent Scientific Assessment of Well Stimulation in California, vol. I, Well Stimulation Technologies and their Past, Present and Potential Future Use in California, Jan. 2015, 62 pages.

Low, "Advances in Ceramic Matrix Composites: Second Edition," Processing, properties, and applications of SiC, 2018, 11 pages.

Lu et al., "Fabrication and characterization of ceramic coatings with alumina-silica sol-incorporated a-alumina powder coated on woven quartz fiber fabrics," vol. 39, Issue 6, Aug. 2013, pp. 6041-6050.

Luan et al., "Creation of synthetic samples for phsyical modelling of natural shale," Geophysical Prospecting vol. 64, Jul. 2016, 17 pages.

Lyngra et al. "Heavy Oil Characterization: Lessons Learned During Placement of a Horizontal Injector at a Tar/Oil Interface," SPE-172673-MS, Society of Petroleum Engineers, presented at the SPE Middle East Oil & Gas Show and Conference, Bahrain, Mar. 8-11, 2015, 20 pages.

(56) References Cited

OTHER PUBLICATIONS

Mahabadi et al., "A novel approach for micro-scale characterization and modeling of geomaterials incorporating actual material heterogeneity," (XP002689941) Geophysical Research Letters, American Geophysical Union, vol. 39, No. 1, L01303, Jan. 1, 2012; 6 pages.
Mahmoud et al., "Removal of Pyrite and Different Types of Iron Sulfide Scales in Oil and Gas Wells without H2S Generation," (IPTC-18279-MS) Presented at the International Petroleum Technology Conference (IPTC), Doha, Qatar, Dec. 6-9, 2015; 8 pages.
Maio et al., "Measuring Fracture Toughness of Coatings using Focused-ion-beam-machined Microbeams," published in 2004, 4 pages.
Marchetti et al., "Fluorous affinity chromatography for enrichment and determination of perfluoroalkyl substances," Annual Review of Analytical Chemistry vol. 84, Jul. 19, 2012, 8 pages.
Maxwell, "Microseismic hydraulic fracture imaging: The path toward optimizing shale gas production," The Leading Edge, Mar. 2011, 6 pages.
McMahon et al., "First 100% Reuse of Bakken Produced Water in Hybrid Treatments Using Inexpensive Polysaccharide Gelling Agents," SPE-173783-MS, Apr. 2015, 9 pages.
Mehrabian and Abousleiman, "Generalized Biot's Theory an Mandel's Problem of Multiple Porosity and Multiple-Permeability Poroelasticity," Journal of Geological Research: Solid Earth, vol. 119, No. 4, 2014, 19 pages.
Mesa, "Spherical and rounded cone nano indenters," Micro Star Technologies Inc., available on or before Jan. 23, 2018, 24 pages.
Meyers et al., "Point load testing of drill cuttings from the determination of rock strength," ARMA-05-712, 40th U.S. Symposium on Rock Mechanics (USRMS), Alaska Rocks 2005, American Rock Mechanics Association, Jun. 25-29, 2005, 2 pages, Abstract.
Middleton et al., "Shale gas and non-aqueous fracturing fluids: Opportunities and challenges for supercritical CO2," Applied Energy 2015, 147, pp. 500-509, 10 pages.
Montgomery and Smith, "Hydraulic Fracturing: History of Enduring Technology," Journal of Petroleum Technology, Dec. 2010, 7 pages.
Montgomery, "Chapter 2: Fracturing Fluid Components," Intech open science open minds, Montgomery, 2013, 21 pages.
Montgomery, "Fracturing Fluids," Chapter 1, Effective and Sustainable Hydralic Fracturing, Intech, the proceedings of the International Conference for Effective and Sustainable Hydraulic Fracturing (HF2103) on May 20-22, 2013, 23 pages.
Moyer, "A Case for Molecular Recognition in Nuclear Separations: Sulfate Separation from Nuclear Wastes," Inorganic Chemisty, copyright 2012, pp. 3473-3490.
Moyner et al., "The Application of Flow Diagnostics for Reservoir Management," Society of Petroleum Engineers (SPE), Apr. 2015, 18 pages.
Nguyen and Abousleiman, "Poromechanics Response of Inclined Wellbore Geometry in Chemically Active Fractured Porous Media," Journal of Engineering Mechanics, vol. 135, No. 11, Nov. 2005, 14 pages.
Oliver and Pharr, "An improved technique for determining hardness and elastic modulus using load and displacement sensing indentation experiments," Journal of Materials Research, vol. 7, No. 6, Jun. 1992, 20 pages.
Oliver and Pharr, "Measurement of hardness and elastic modulus by instrumented indentation: Advances in understanding and refinements to methodology," Journal of Materials Research, vol. 19, No. 1, Jan. 2004, 18 pages.
Ortega et al., "The Effect of Particle Shape and Grain-Scale Properties of Shale: A Micromechanics Approach," Int. J. Numer, Anal. Methd. Geomech., published in 2010, 33 pages.
Ortega et al., "The Effect of the Nanogranular Nature of Shale on their Poroelastic Behavior," Acta Geotechnica, published in 2007, 28 pages.
Ortega et al., "The Nanogranular Acoustic Signature of Shale," Geophysics, vol. 74, No. 3, May-Jun. 2009, 20 pages.
Osman and Pao, "Mud Weight Predition for Offshore Drilling," 8 pages.
Ottesen, "Wellbore Stability in Fractured Rock," IADC/SPE 128728, Society of Petroleum Engineers, presented at the 2010 IADC/SPE Drilling Conference and Exhibition, Louisiana, Feb. 2-4, 2010, 8 pages.
Pant, "Nanoindentation characterization of clay minerals and clay-based hybrid bio-geomaterials," disseration for degree of Doctor of Philosophy in the Department of Civil and Environmental Engineering at the Louisiana State University and Agricultural and Medical College, Dec. 2013, 111 pages.
Passey et al., "From Oil-Prone Source Rock to Gas-Producing Shale Reservoir—Geologic and Petrophysical Characterization of Unconventional Shale-Gas Reservoirs," Society of Petroleum Engineers International, CPS/SPE International Oil & Gas Conference and Exhibition, Beijing, China, Jun. 8-10, 2010, 29 pages.
Patel et al., "Analysis of US Hydraulic Fracturing Fluid System and Proppant Trends," SPE 168645, presented at the SPE Hydraulic Fracturing technology Conference, Feb. 4-6, 2014, 20 pages.
Petoud et al., "Brilliant SM, Eu, Tb, and Dy Chiral Lanthanide Complexes with Strong Circularly Polarized Luminescence," Journal fo the American Chemical Society (JACS), Dec. 15, 2006, 7 pages.
petrowiki.org [online], "Fluid flow in naturally fractured reservoirs," retrieved from URL <https://petrowiki.org/Fluid_flow_in_naturally_fractured_reservoirs>, available on or before Jul. 16, 2015, retrieved on Nov. 11, 2019, 12 pages.
Podio et al., "Dynamic Properties of Dry and Water-Saturated Green River Shale under Stress," Jun. 11, 1968, SPE 1825, 16 pages.
Pollard, D. D.and Fletcher, R.C., "Fundamentals of Structural Geology," Cambridge University Press, Sep. 1, 2005; p. 291.
Pollock and Hammiche, "Micro-thermal analysis: techniques and applications," Journal of Physics D: Applied Physics, vol. 34.9, 2001, 31 pages.
Poon et al., "An Analysis of Nanoindentation in Linearly Elastic Solids," International Journal of Solids and Structures, vol. 45, No. 24, Dec. 1, 2008; 16 pages.
Qin et al, "Applicability of nonionic surfactant alkyl polyglucoside in preparation of liquid CO2 emulsion," Journal of CO2 Utilization, 2018, 26, pp. 503-510, 8 pages.
Rajbanshi et al., "Sulfate Separation from Aqueous Alkaline Solutions by Selective Crystallization of Alkali Metal Coordination Capsules," Cryst. Growth Des., published in 2011, pp. 2702-2706.
Ribeiro and Sharma, "Fluid Selection for Energized Fracture Treatments," SPE 163867, presented at the SPE Hydraulic Fracturing Technology Conference, Feb. 4-6, 2013, 11 pages.
Richard et al, "Slow Relaxation and Compaction of Granular Systems," Nature Materials, vol. 4, Feb. 2005, 8 pages.
Rodriguez et al., "Imagining techniques for analyzing shale pores and minerals," National Energy Technology Laboratory, Dec. 2, 2014, 44 pages.
Rostami et al., "DABCO tribromide immobilized on magnetic nanoparticle as a recyclable catalyst for the chemoselective oxidation of sulfide using H2O2 under metaland solvent-free condition," Catal. Commun, 2014, 43, 16-20, 20 pages.
Rowan et al., "Dynamic Covalent Chemistry," Angewante Chemie International Edition, Mar. 15, 2002, 55 pages.
Ryoo et al, "Water-in-Carbon Dioxide Microemulsions with Methylated Branched Hydrocarbon Surfactants," Industrial & Engineering Chemistry Research 2003 42 (25), pp. 6348-6358, 11 pages.
Sagisaka et al, "A New Class of Amphiphiles Designed for Use in Water-in-Supercritical CO2 Microemulsions," Langmuir 2016 32 (47), pp. 12413-12422, 44 pages.
Sagisaka et al, "Effect of Fluorocarbon and Hydrocarbon Chain Lengths In Hybrid Surfactants for Supercritical CO2," Langmuir 2015 31 (27), pp. 7479-7487, 36 pages.
Sagisaka et al, "Nanostructures in Water-in-CO2 Microemulsions Stabilized by Double-Chain Fluorocarbon Solubilizers," Langmuir 2013 29 (25), pp. 7618-7628, 11 pages.
Santarelli et al., "Drilling through Highly Fractured Formations: A Problem, a Model, and a Cure," presented at the 67th Annual Technical Conference and Exhibition of the Society of Petroleum Engineers, Washington D.C., Oct. 4-7, 1992, 10 pages.

(56) References Cited

OTHER PUBLICATIONS

Sayed and Al-Muntasheri, "A Safer Generation of Wettability Alteration Chemical Treatments," SPE-184566-MS, presented at the SPE International Conference on Oilfield Chemistry, Apr. 3-5, 2017, 25 pages.

Selvin et al., "Principles and biophysical applications of lanthanide-based probes," Annual Review of Biophysics and Biomolecular Structure, Jun. 2002, 28 pages.

Sepulveda et al., "Oil-Based Foam and Proper Underbalanced-Drilling Practices Improve Drilling Efficiency in a Deep Gulf Coast Well," SPE 115536, presented at the 2008 SPE Annual Technical Conference and Exhibition in Denver, Colorado, Sep. 21-24, 2008, 8 pages.

Serra, "No Pressure Transient Analysis Methods for Naturally Fractured Reservoirs (includes assosciated papers 12940 and 13014)," Journal of Petroleum Technology, vol. 35, Issue 12, Society of Petroleum Engineers, Dec. 1983, 18 pages.

Serres-Piole et al., "Water tracers in oilfield applications: Guidelines," Elsevier Ltd., Journal of Science and Engineering, Nov. 2012, 18 pages.

Shahid et al., "Natural-fracture reactivation in shale gas reservoir and resulting microseismicity," Journal of Canadian Petroleum Technology vol. 54.06, 2015.

Shin et al., "Development and Testing of Microcompression for Post Irradiation Characterization of ODS Steels," J. Nuclear Materials, published in 2014, 6 pages.

Shook et al., "SPE 124614: Determining Reservoir Properties and Flood Performance from Tracer Test Analysis," Society of petroleum Engineers (SPE), presented at SPE Annual Technical Conference and Exhibition, Oct. 4-7, 2009, 19 pages.

Shukla et al., "ARMA 13-578: Nanoindentation Studies on Shales," ARMA, presented at the 47th US Rock Mechanics/Geomechanics Symposium, Jun. 23-26, 2013, 10 pages.

Sierra et al., "Woodford Shale Mechanical Properties and the Impacts of Lithofacies," ARMA 10-461, copyright 2010, 10 pages.

Singh et al., "Facies classification based on seismic waveform," presented at the 5th Conference & Exposition on Petroleum Geophysics, Jan. 15-17, 2004, 7 pages.

Siskin et al., "Reactivity of organic compounds in hot water: geochemical and technological implications," Science, Oct. 11, 1991, 8 pages.

Slatt et al., "Merging Sequence Stratigraphy and Geomechanics for Unconventional Gas Shales," The Leading Edge, Mar. 2011, 8 pages.

Slatt et al., "Outcrop/Behind Outcrop (Quarry), Multiscale Characterization of the Woodford Gas Shale," copyright 2011, 22 pages.

Sone et al., "Mechanical Properties of Shale-Gas Reservoir Rocks—Part 1: Static and Dynamic Elastic Properties and Anisotropy," Geophysics, vol. 78, No. 5, Sep.-Oct. 2013, 12 pages.

Sone et al., "Mechanical properties of shale-gas reservoir rocks—Part 2: Ductile creep, brittle strength, and their relation to the elastic modulus," 2013, Geophysics, vol. 78, No. 5, 10 pages.

Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.

Soni, "LPG-Based Fracturing: An Alternative Fracturing Technique in Shale Reservoirs," IADC/SPE-170542-MS, IADC/SPE Asia Pacific Drilling Technology Conference, Aug. 25-27, 2014, 7 pages.

Stiles et al., "Surface-enhanced Raman Spectroscopty," Annual Review of Analytical Chemistry, Mar. 18, 2008, 29 pages.

Tabatabaei et al., "Well performance diagnosis with temperature profile measurements," in SPE Annual Technical Conference and Exhibition, Society of Petroleum Engineers, Oct. 30-Nov. 2, 2011, published Jan. 2011, 16 pages.

Tian et al., "Off-Resonant Gold Superstructures as Ultrabright Minimally Invasive Surface-Enhanced Raman Scattering (SERS) Probes," American Chemical Society, Jul. 2015, 7 pages.

Ulboldi et al., "Rock strength measurement on cuttings as input data for optimizing drill bit selection," SPE 56441, presented at the 1999 SPE Annual Technical Conference and Exhibition in Houston, Texas, Oct. 3-6, 1999, 9 pages.

Uleberg and Kleppe, "Dual Porosity, Dual Permeability Formulation for Fractured Reservoir Simulation," Combined Gas/Water Injection Subprogram, 1996, 12 pages.

Ulm et al., "Material Invariant Poromechanics Properties of Shales," published in 2005, 8 pages.

Ulm et al., "The Nanogranular Nature of Shale," Acta Geotechnica, published in 2006, 12 pages.

Vanlandingham, "Review of Instrumented Indentation," Journal of Research of the National Institute of Standards and Technology, vol. 108, No. 4, Jul.-Aug. 2003; 17 pages.

Vernik et al., "Ultrasonic Velocity and Anisotropy of Hydrocarbon Source Rocks," Geophysics, vol. 57, No. 5, May 1992, 9 pages.

Walters et al., "Inetic rheology of hydraulic fracturing fluids," SPE Annual Technical Conference and Exhibition, Society of Petroleum Engineers, 2001.

Walters et al., "Kinetic rheology of hydraulic fracturing fluids." SPE Annual Technical Conference and Exhibition, Society of Petroleum Engineers, Sep. 2001.

Wang et al. Iron Sulfide Scale Dissolvers: How Effective Are They?, SPE 168063, Society of Petroleum Engineers, presented at the SPE Saudi Arabia section Annual Technical Symposium and Exhibition, May, 19-22, 2013, 22 pages.

Wang et al., "A Feasibility Analysis on Shale Gas Exploitation with Supercritical Carbon Dioxide," Energy Sources, Part A: Recoeiy, Utilization and Environmental Effects, vol. 34, No. 15, 2012.

Wang et al., "A Numerical Study of Factors Affecting the Characterization of Nanoindent ation on Silicon," Materials Science and Engineering: A, vol. 447, No. 1, Feb. 25, 2007; 10 pages.

Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, vol. 41, Issue 2: pp. 245-253.

Warpinski, "Understanding Hydraulic Fracture Growth, Effectiveness, and Safety Through Microseismic Monitoring," Intech, May 17, 2013, 14 pages.

Warren and Root, "The Behavior of Naturally Fractured Reservoirs," SPE Journal, vol. 3, No. 3, pp. 245-255, Sep. 1963, 11 pages.

Wegst et al., "Bioinspired structural materials," Nature Materials, vol. 14, Jan. 2015, 14 pages.

Wenk et al., "Preferred Orientation and Elastic Anisotropy of Illite-Rich Shale," Geophysics, vol. 72, No. 2, Mar.-Apr. 2007, 7 pages.

Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.

Wilson and Aifantis, "On the Theory of Consolidation with Double Porosity," International Journal of Engineering Science, vol. 20, No. 9, 1982, 27 pages.

Wilson et al., "Fracture testing of bulk silicon microcantilever beams subjected to a side load," Journal of Microelectromechanical Systems, vol. 5, No. 3, Sep. 1996; 9 pages.

Wu et al., "A reusable biosensor chip for SERS-fluorescence dual mode immunoassay," Proc. SPIE 9543, Third International Symposium on Laser Interaction with Matter, 954317, May 4, 2015, 6 pages.

Wu et al., "A SERS-Assisted 3D Barcode Chip for High-Throughput Biosensing," Small Journal vol. 11, No. 23, Jun. 11, 2015, 9 pages.

Wurster et al., "Characterization of the fracture toughness of microsized tungsten single crystal notched specimens," Philosophical Magazine, vol. 92, No. 14, May 2012; 23 pages.

Wurzenberger et al., "Nitrogen-Rich Copper(II) Bromate Complexes: an Exotic Class of Primary Explosives," Journal of Inorganic Chemistry, vol. 57, 2018, 10 pages.

Xu et al., "Anisotropic elasticity of jarosite: A high-P synchrotron XRD study," American Mineralogist, vol. 95, Issue 1, 2010, 5 pages.

(56) References Cited

OTHER PUBLICATIONS

Xu et al.., "Measurement of two-photon excitation cross sections of molecular fluorophores with data from 690 to 1050 mu," Journal of the Optical Society of America B, Mar. 1996, 11 pages.

Yang et al., "Nanoscale geochemical and geomechanical characterization of organic matter in shale," Nature Communications, vol. 8, 2179, Dec. 19, 2017, 9 pages.

Zamberi et al., "SPE 166005: Improved Reservoir Surveillance Through Injected Tracers In A Saudi Arabian Field: Case Study," Society of Petroleum Engineers (SPE), presented at SPE Reservoir Characterization and Simulation Conference and Exhibition, Sep. 16-18, 2013, 15 pages.

Zemel, "Chapter 3: Interwell Water Tracers," Tracers in the Oil Field, vol. 43, 1st Edition, Elsevier Science, Jan. 13, 1995, 47 pages.

Zeszotarski et al., "Imaging and Mechanical Property Measurements of Kerogen via Nanoindentation," Geochimica et Cosmochimica Acta, vol. 68, No. 20, Oct. 15, 2004, 7 pages.

Zhou et al., "Upconversion luminescent materials: advances and applications," Chem Rev., Jan. 14, 2015, 71 pages.

Zielinski et al., "A Small-Angle Neutron Scattering Study of Water in Carbon Dioxide Microemulsions," Langmuir 1997, 13(15), pp. 3934-3937, 4 pages.

Zimmerman and Bodvarsson, "Hydraulic Conductivity of Rock Fractures," transport in Porous Media, vol. 23, Jan. 1996, 31 pages.

\* cited by examiner

200

- 202 — Selecting a polyhalogen salt
- 204 — Encapsulating the polyhalogen salt in a polymer
- 206 — Mixing the encapsulated polyhalogen salt in a fluid
- 208 — Flowing the mixture of encapsulated polyhalogen salt and fluid into a location within a subterranean formation at which kerogen is present

FIG. 2

DELIVERY OF HALOGENS TO A SUBTERRANEAN FORMATION

TECHNICAL FIELD

This document relates to compositions and methods of delivering halogens to a subterranean formation.

BACKGROUND

Unconventional source rock formations differ from traditional source rock reservoirs at least in that unconventional source rock formations include the organic material, kerogen. Kerogen can account for 5-10% (10-20% vol) of the source rock formation. Kerogen is a polymer-like intertwined organic material and is known to affect the fracture behavior and hydraulic conductivity of a hydraulic fracture. The kerogen can alter the tensile strength of the rock and as a result, contribute to greater fracturing energy needed to propagate the fracture than in formations without the kerogen material.

SUMMARY

This disclosure describes compositions and method for generating halogens in situ in a subterranean formation.

The following units of measure have been mentioned in this disclosure:

| Unit of Measure | Full form |
|---|---|
| °C. | Degree Celsius |
| M | Molarity, moles/liter |
| mmol | milimole |
| mL | milliliter |
| cm | centimeter |
| psi | pounds per square inch |

In some implementations, a composition for treating kerogen in a subterranean formation includes a polyhalogen salt encapsulated in a polymer.

This aspect, taken alone or combinable with any other aspect, can include the following features. The polyhalogen salt includes an anion selected from a group consisting of $Br_3^-$, $Br_2Cl^-$, $BrCl_2^-$, $BrI_2^-$, $Br_2I^-$, $I_3^-$, $ClI_4^-$, $BrI_6^-$, $ICl_2^-$, $ICl_4^-$ and $I_3Br_4^-$.

This aspect, taken alone or combinable with any other aspect, can include the following features. The polyhalogen salt includes an alkali metal cation or an alkaline earth metal cation.

This aspect, taken alone or combinable with any other aspect, can include the following features. The polyhalogen salt includes a quaternary ammonium cation selected from a group consisting of tetramethylammonium, tetraethylammonium, tetrabutylammonium, benzyltrimethylammonium, and cetyltrimethylammonium.

This aspect, taken alone or combinable with any other aspect, can include the following features. The polyhalogen salt includes a cation selected from a group consisting of imidazolium, pyridinium, and pyrrolidinium.

This aspect, taken alone or combinable with any other aspect, can include the following features. The polyhalogen salt includes a cation with carbon-fluorine bonds.

This aspect, taken alone or combinable with any other aspect, can include the following features. The cation is selected from a group consisting of $[P(CF_3)_4]^+$, $[N(CF_3)_4]^+$, or bis(tri(4-fluorophenyl)phosphine)iminium.

This aspect, taken alone or combinable with any other aspect, can include the following features. The polymer is a polymer matrix selected from a group consisting of polyvinyl butyral polymer, vinyl acetal polymers, butyral polymers, sytrene/-maleic anyhydride copolymers, and alkylated vinylpyrrolidone copolymers.

This aspect, taken alone or combinable with any other aspect, can include the following features. The polymer is an enteric coating, wherein the enteric coating is selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

In some implementations, a method of treating kerogen in a subterranean formation includes selecting a polyhalogen salt, encapsulating the polyhalogen salt in a polymer, mixing the encapsulated polyhalogen salt in a fluid, and flowing the mixture of encapsulated polyhalogen salt and fluid into a location within the subterranean formation at which kerogen is present.

This aspect, taken alone or combinable with any other aspect, can include the following features. Mixing the encapsulated polyhalogen salt in a fluid includes mixing the polyhalogen salt in a carbon dioxide-based fluid or foam.

This aspect, taken alone or combinable with any other aspect, can include the following features. Mixing the encapsulated polyhalogen salt in a fluid includes mixing the polyhalogen salt in an aqueous-based fluid.

This aspect, taken alone or combinable with any other aspect, can include the following features. Selecting the polyhalogen salt includes selecting a salt comprising an anion from a group consisting of $Br_3^-$, $Br_2Cl^-$, $BrCl_2^-$, $BrI_2^-$, $Br_2I^-$, $I_3^-$, $ClI_4^-$, $BrI_6^-$, $ICl_2^-$, $ICl_4^-$, and $I_3Br_4^-$.

This aspect, taken alone or combinable with any other aspect, can include the following features. Selecting the polyhalogen salt includes selecting a salt comprising a cation from a group consisting of alkali metal cations or alkaline earth metal cations.

This aspect, taken alone or combinable with any other aspect, can include the following features. Selecting the polyhalogen salt includes selecting a salt that comprises a quaternary ammonium cation selected from a group consisting of tetramethylammonium, tetraethylammonium, tetrabutylammonium, benzyltrimethylammonium, and cetyltrimethylammonium.

This aspect, taken alone or combinable with any other aspect, can include the following features. Selecting the polyhalogen salt includes selecting a salt that comprises a cation selected from a group consisting of imidazolium, pyridinium, and pyrrolidinium cations.

This aspect, taken alone or combinable with any other aspect, can include the following features. Selecting the polyhalogen salt includes selecting a salt that comprises a cation with carbon-fluorine bonds.

This aspect, taken alone or combinable with any other aspect, can include the following features. Selecting the polyhalogen salt includes selecting a salt that comprises a cation selected from a group consisting of $[P(CF_3)_4]^+$, $[N(CF_3)_4]^+$, and bis(tri(4-fluorophenyl)phosphine)iminium cations.

This aspect, taken alone or combinable with any other aspect, can include the following features. Encapsulating the salt in a polymer includes encapsulating the salt in a polymer matrix selected from a group consisting of polyvinyl butyral polymer, vinyl acetal polymers, butyral polymers, sytrene/-maleic anyhydride copolymers, and alkylated vinylpyrrolidone copolymers.

This aspect, taken alone or combinable with any other aspect, can include the following features. Encapsulating the polyhalogen salt in a polymer includes encapsulating the salt in an enteric coating, wherein the enteric coating is selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

In some implementations, a composition for treating kerogen in a subterranean formation includes at least one of a bromate or chlorate salt, wherein the bromate or chlorate salt is encapsulated in a first polymer, and an acid.

This aspect, taken alone or combinable with any other aspect, can include the following features. The first polymer is a polymer matrix selected from a group consisting of polyvinyl butyral polymer, vinyl acetal polymers, butyral polymers, sytrene/-maleic anhydride copolymers, and alkylated vinylpyrrolidone copolymers.

This aspect, taken alone or combinable with any other aspect, can include the following features. The first polymer is an enteric coating and is selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

This aspect, taken alone or combinable with any other aspect, can include the following features. The acid is encapsulated in a second polymer, wherein the second polymer is a polymer matrix selected from a group consisting of polyvinyl butyral polymer, vinyl acetal polymers, butyral polymers, sytrene/-maleic anhydride copolymers, and alkylated vinylpyrrolidone copolymers.

This aspect, taken alone or combinable with any other aspect, can include the following features. The acid is encapsulated in a second polymer, wherein the second polymer is an enteric coating selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

This aspect, taken alone or combinable with any other aspect, can include the following features. The acid is lactic acid, polylactic acid, chloracetic acid, citric acid, oxalic acid, benzoic acid, furoic acid, or aqueous hydrochloric acid.

In some implementations, a method for treating kerogen in a subterranean formation includes encapsulating at least one of a bromate or chlorate salt in a first polymer, flowing the encapsulated bromate or chlorate salt into a subterranean formation at which kerogen is present, selecting an acid, flowing the acid into a location in the subterranean formation at which kerogen is present, and contacting the bromate or chlorate salt with the acid.

This aspect, taken alone or combinable with any other aspect, can include the following features. Encapsulating at least one of a bromate or chlorate salt in a first polymer includes encapsulating the bromate or chlorate salt in a polymer matrix selected from a group consisting of polyvinyl butyral polymer, vinyl acetal polymers, butyral polymers, sytrene/-maleic anhydride copolymers, and alkylated vinylpyrrolidone copolymers.

This aspect, taken alone or combinable with any other aspect, can include the following features. Encapsulating at least one of a bromate or chlorate salt in a first polymer comprises encapsulating the bromate or chlorate salt in an enteric coating selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

This aspect, taken alone or combinable with any other aspect, can include the following features. Selecting the acid includes selecting the acid from a group consisting of lactic acid, polylactic acid, chloracetic acid, citric acid, oxalic acid, benzoic acid, furoic acid, and aqueous hydrochloric acid.

This aspect, taken alone or combinable with any other aspect, can include the following features. The selected acid is encapsulated in a second polymer, wherein the second polymer is a polymer matrix selected from a group consisting of polyvinyl butyral polymer, vinyl acetal polymers, butyral polymers, sytrene/-maleic anhydride copolymers, and alkylated vinylpyrrolidone copolymers.

This aspect, taken alone or combinable with any other aspect, can include the following features. The selected acid is encapsulated in a second polymer, wherein the second polymer is an enteric coating selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

This aspect, taken alone or combinable with any other aspect, can include the following features. The salt and the acid are flowed into the subterranean formation simultaneously.

In some implementations, a composition for treating kerogen in a subterranean formation includes at least one of a bromate or chlorate salt, wherein the bromate or chlorate salt is encapsulated in a first polymer, and a reducing agent.

This aspect, taken alone or combinable with any other aspect, can include the following features. The reducing agent is encapsulated in a second polymer.

This aspect, taken alone or combinable with any other aspect, can include the following features. The first polymer is a polyvinyl butyral polymer, vinyl acetal polymer, butyral polymer, styrene/-maleic anhydride copolymer, or alkylated vinylpyrrolidone copolymer.

This aspect, taken alone or combinable with any other aspect, can include the following features. The first polymer is an enteric coating, wherein the enteric coating is methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, or zein.

This aspect, taken alone or combinable with any other aspect, can include the following features. The second polymer is a polyvinyl butyral polymer, vinyl acetal polymer, butyral polymer, styrene/-maleic anhydride copolymer, or alkylated vinylpyrrolidone copolymer.

This aspect, taken alone or combinable with any other aspect, can include the following features. The second polymer is an enteric coating, wherein the enteric coating is a methylacrylate-methacrylic acid copolymer, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, or zein.

This aspect, taken alone or combinable with any other aspect, can include the following features. The reducing agent has a standard reduction potential between that of the bromate or chlorate salt and the corresponding halogen.

This aspect, taken alone or combinable with any other aspect, can include the following features. The reducing agent is at least one of sulfur, red phosphorus, bisulfite, iodide, or iodine.

In some implementations, a method for treating kerogen in a subterranean formation includes encapsulating at least one of a bromate or chlorate salt in a first polymer, flowing the encapsulated bromate or chlorate salt into a subterranean formation at which kerogen is present, flowing a reducing agent into the subterranean formation at which kerogen is present, and contacting the bromate or chlorate salt with the reducing agent.

This aspect, taken alone or combinable with any other aspect, can include the following features. The reducing agent is encapsulating in a second polymer before flowing the reducing agent into the subterranean formation at which kerogen is present.

This aspect, taken alone or combinable with any other aspect, can include the following features. The first polymer is a polymer matrix selected from a group that consists of polyvinyl butyral polymer, vinyl acetal polymer, butyral polymers, styrene/-maleic anhydride copolymer, and alkylated vinylpyrrolidone copolymer.

This aspect, taken alone or combinable with any other aspect, can include the following features. The first polymer is an enteric coating, wherein the enteric coating is selected from a group that consists of methylacrylate-methacrylic acid copolymer, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

This aspect, taken alone or combinable with any other aspect, can include the following features. The second polymer is a polymer matrix selected from a group that consists of polyvinyl butyral polymer, vinyl acetal polymer, butyral polymers, styrene/-maleic anhydride copolymer, and alkylated vinylpyrrolidone copolymer.

This aspect, taken alone or combinable with any other aspect, can include the following features. The second polymer is an enteric coating, wherein the enteric coating is selected from a group that consists of methylacrylate-methacrylic acid copolymer, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

This aspect, taken alone or combinable with any other aspect, can include the following features. The reducing agent has a standard reduction potential between that of the bromate or chlorate salt and the corresponding halogen.

This aspect, taken alone or combinable with any other aspect, can include the following features. The reducing agent is selected from a group that consists of sulfur, red phosphorus, bisulfate, iodide, and iodine.

In some implementations, a composition for treating kerogen in a subterranean formation includes a fracturing fluid, and at least one N-halosuccinimide selected from a group consisting of N-bromosuccinimide, N-chlorosuccinimde, and N-iodosuccinimide, wherein the N-halosuccinimide is dissolved in the fracturing fluid, and wherein the N-halosuccinimide is present in the fracturing fluid at a concentration of 0.001 M to 0.10 M.

This aspect, taken alone or combinable with any other aspect, can include the following features. The fracturing fluid is an aqueous-based fracturing fluid.

This aspect, taken alone or combinable with any other aspect, can include the following features. The fracturing fluid is a carbon-dioxide based fluid.

In some implementations, a composition for treating kerogen in a subterranean formation includes a polymer, at least one N-halosuccinimide selected from a group consisting of N-bromosuccinimide, N-chlorosuccinimide, and N-iodosuccinimide, wherein the N-halosuccinimide is encapsulated in the polymer, and carbon dioxide-based fluid.

This aspect, taken alone or combinable with any other aspect, can include the following features. The polymer is a polymer matrix selected from a group consisting of polyvinyl butyral polymer, vinyl acetal polymer, butyral polymer, styrene/-maleic anhydride copolymer, and alkylated vinylpyrrolidone copolymer.

This aspect, taken alone or combinable with any other aspect, can include the following features. The polymer is an enteric coating selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

This aspect, taken alone or combinable with any other aspect, can include the following features. The encapsulated N-halosuccinimide is dissolved in the carbon dioxide-based fluid at a concentration of 5 to 100 pounds of encapsulated N-halosuccinimide per 1000 gallons of carbon dioxide-based fluid.

In some implementations, a method for treating kerogen in a subterranean formation includes dissolving at least one N-halosuccinimide selected from a group consisting of N-bromosuccinimide, N-chlorosuccinimide, and N-iodosuccinimide in a fracturing fluid to create an N-halosuccinimide solution, and flowing the N-halosuccinimide solution into a subterranean formation at which kerogen is present.

This aspect, taken alone or combinable with any other aspect, can include the following features. The N-halosuccinimide is dissolved in the fracturing fluid at a concentration of 0.001 M to 0.10 M.

This aspect, taken alone or combinable with any other aspect, can include the following features. The fracturing fluid is an aqueous-based fracturing fluid.

This aspect, taken alone or combinable with any other aspect, can include the following features. The fracturing fluid is a carbon dioxide-based fracturing fluid.

This aspect, taken alone or combinable with any other aspect, can include the following features. The N-halosuccinimide is encapsulated before dissolving the N-halosuccinimide in the fracturing fluid, wherein the encapsulated N-halosuccinimide is dissolved in the fracturing fluid at a concentration of 1 to 100 pounds of encapsulated N-halosuccinimide per 10000 gallons of fracturing fluid.

This aspect, taken alone or combinable with any other aspect, can include the following features. The N-halosuccinimide is encapsulated in a polymer matrix selected from a group consisting of polyvinyl butyral, vinyl acetal polymer, butyral, styrene/-maleic anhydride copolymer, and alkylated vinylprrolidone copolymer.

This aspect, taken alone or combinable with any other aspect, can include the following features. The N-halosuccinimide is encapsulated in an enteric coating selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

FIG. 2 is a flow chart illustrating an example method of treating kerogen in a subterranean formation.

Like reference symbols in the various drawings indicate like elements.

DETAILED DESCRIPTION

Figure 1A:
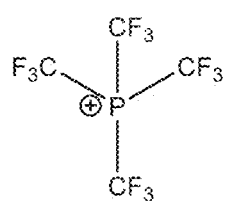
FIG. 1A shows the structure of a $[P(CF_3)_4]^+$ ion.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Provided in this disclosure, in part, are compositions and methods for generating halogens in situ in a subterranean formation. In this disclosure, the general term "halogen" can refer to any one of the diatomic molecules $Br_2$, $Cl_2$, $I_2$, or $F_2$, unless otherwise specified.

Bromine ($Br_2$) is effective at partially depolymerizing kerogen in source rock, which allows it to dissolve in hydrocarbons and flow out of the formation. However, bromine also reacts with metal, such as that found in down-hole tubulars. Therefore, bromine introduced to a well bore could negatively impact the integrity of the tubulars and potentially be consumed, which limits its application in an aqueous system. Encapsulation of bromine itself is difficult because bromine is a volatile liquid. Aside from these chemical considerations, bromine and other halogens are dangerous to handle in the field.

Provided in this disclosure are compositions and methods to generate bromine and other halogens in situ in a subterranean formation, thus minimizing damage to tubulars and other parts of the wellbore, and preventing a halogen from prematurely reacting with materials other than kerogen. In addition, generating the bromine or other halogen in situ reduces the safety considerations necessary in the field.

Generating the bromine or other halogens in situ includes, in some implementations, a delayed generation of the bromine or halogen. This can occur, for example, by the decomposition of precursors, a chemical reaction, the encapsulation of precursors or reactants, or a combination of these approaches.

For example, bromine and other halogens can be generated in situ by the decomposition of polyhalogen salts in a subterranean formation. Polyhalogens include polyatomic anions that contain only halogen atoms. Polyhalogens can contain one or more than one type of halogen atom, for example $I_3^-$ or $ICl_2$.

In some implementations, salts containing polyhalogen ions are encapsulated in a polymer matrix. Polyhalogen salts can be formed by the reaction of halide ions with halogens and heteroatomic congeners to form stable polyhalogen ions. Examples of halogens include $F_2$, $Cl_2$, $Br_2$, and $I_2$. Examples of halide ions include $Cl^-$, $Br^-$, and $I^-$. Equations 1-6 show examples of the equilibria between halides and halogens and the corresponding polyhalogen ion. The bonding in these polyhalogen ions is relatively weak π-bonding. At temperatures of 130-180° C., these polyhalogen compounds will decompose to yield a halogen and a halide. This decomposition process is accelerated in the presence of water. Therefore, in a subterranean formation where temperatures are sufficiently high or water is present, the polyhalogen ions will decompose to yield halide ions and halogens.

  (Eq. 1)

  (Eq. 2)

  (Eq. 3)

  (Eq. 4)

  (Eq. 5)

  (Eq. 6)

In some implementations, the polyhalogen salt will contain an anion selected from $Br_3^-$, $Br_2Cl^-$, $BrCl_2^-$, $Br_2I^-$, $I_3^-$, $ClI_4^-$, $BrI_6^-$, $ICl_2^-$, $ICl_4^-$, $I_3Br_4^-$ and mixtures thereof. The cation in these salts can be an alkali cation or an alkali earth cation, for example $Li^+$, $Na^+$, $K^+$, $Mg^{2+}$, or $Ca^{2+}$. In some implementations, the cation can include a quaternary ammonium cation selected from the group containing tetramethylammonium, tetraethylammonium, tetrabutylammonium, benzyltrimethylammonium, and cetyltrimethylammonium. In some embodiments, the cation can include a quaternary phosphonium cation selected from tetraphenylphosphonium, tetraethylphosphonium, and tetramethylphosphonium. In some implementations, the cation can include an imidazole, for example imidazolium ([Im]$^+$), pyridinium ([Pyr]$^+$), pyrrolidinium ([Pyrr]$^+$), or 1-butyl-3-methyl-imidazolium ([BMIm]$^+$).

Figure 1B:
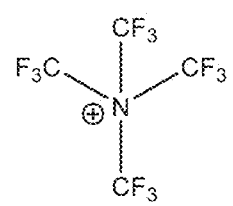
FIG. 1B shows the structure of a $[N(CF_3)_4]^+$ ion.
Figure 1C:
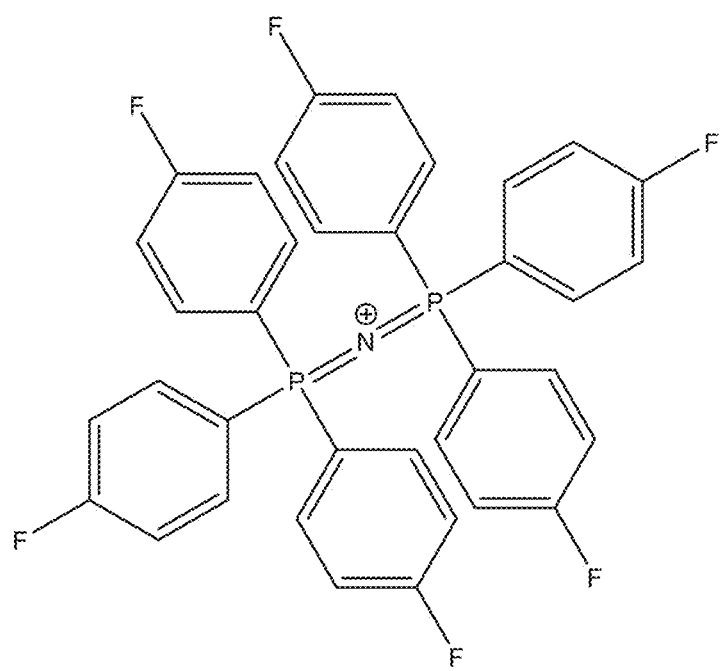
FIG. 1C shows the structure of a bis(tri(4-fluorophenyl)phosphine)iminium ion.

In some implementations, the cation can include fluorine-carbon bonds. Carbon-fluorine bonds reduce the reactivity of a cation and increase the solubility of a salt in organic solvents, for example in carbon dioxide. Cations including carbon-fluorine bonds can include [P(CF$_3$)$_4$]$^+$ (FIG. 1A), [N(CF$_3$)$_4$]$^+$ (FIG. 1B), or bis(tri(4-fluorophenyl)phosphine) iminium (FIG. 1C).

In some implementations, a polyhalogen salt can be dissolved into a fluid medium or fracturing fluid that includes carbon dioxide. This fluid can then be used in subterranean formations for hydraulic fracturing operations, and to treat kerogen in the subterranean formation. Once in the subterranean formation, the polyhalogen salt decomposes to yield a halogen, for example bromine, chlorine, or iodine. The halogens react with and degrade or partially degrade kerogen present in the subterranean formation. The degradation of kerogen can improve the hydraulic conductivity of a hydraulic fracture and increase hydrocarbon recovery from the well.

In some implementations, the polyhalogen salt can be encapsulated by incorporation into a polymer. Encapsulation into a polymer can include incorporation or infusion into a polymer matrix. Encapsulation into a polymer can also include being surrounded by an enteric coating.

The polymer may include a polymer matrix, for example polyvinyl butyral polymer, vinyl acetal polymers, butyral polymers, styrene/-maleic anhydride copolymers, or alkylated vinylpyrrolidone copolymers.

In some implementations, the polyhalogen salt can be encapsulated within an enteric coating, for example with methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, or zein.

In some implementations, the encapsulated polyhalogen salt can be mixed into an aqueous or carbon dioxide based fluid or foam. The fluid or foam can then be flowed into the subterranean formation for use in hydraulic fracturing operations.

FIG. 2 is an example of a method 200 for treating kerogen in a subterranean zone. At 202, a polyhalogen salt is selected. At 204, the polyhalogen salt is encapsulated in a polymer. At 206, the encapsulated polyhalogen salt is mixed in a fluid. At 208, the mixture of encapsulated polyhalogen salt and fluid is flowed into a location within a subterranean formation at which kerogen is present. In some implementations, the fluid is an aqueous-based fluid. In some implementations, the fluid is a carbon dioxide-based fluid or foam.

Another approach to generate halogens in situ includes the use of an unstable oxo-acid. Unstable oxo-acids include bromic acid (HBrO$_3$) and chloric acid (HClO$_3$). HBrO$_3$ is a strong acid with a pKa of approximately −2, and decomposes to yield bromine. HClO$_3$ is a strong acid with a pKa of approximately −1, and decomposes to yield chlorine and chlorine dioxide.

Both HBrO$_3$ and HClO$_3$ can be formed by protonation of bromate or chlorate, respectively, as shown in Eq. 7, where X is Br or Cl.

$$[XO_3]^- \xrightarrow{H^+} HXO_3 \qquad (Eq.~7)$$

Accordingly, the unstable oxo-acids can be produced in situ by protonating bromate or chlorate anions with a hydrogen ion. The source of the hydrogen ion H$^+$ can be an acid. The acid can be an encapsulated solid, or a free acid in the medium. The bromate and chlorate ions can be present as bromate and chlorate salts with alkali cations, for example Na$^+$ and K$^+$.

In some implementations, a composition for treating kerogen in a subterranean formation includes at least one bromate or chlorate salt. For example, the composition can include bromate salts, chlorate salts, or a mixture of bromate and chlorate salts. These salts or mixtures of salts can be encapsulated in a first polymer. The first polymer can be a polymer matrix, for example polyvinyl butyral polymer, vinyl acetal polymers, butyral polymers, styrene/-maleic anhydride copolymers, or alkylated vinylpyrrolidone copolymers.

The first polymer can be an enteric coating, for example methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, or zein. The encapsulated bromate or chlorate salt, or mixture of encapsulated bromate and chlorate salt, can be dispersed or suspended in a fluid medium or fracturing fluid. The fracturing fluid can be an aqueous solvent. Alternatively, the fracturing fluid can be a carbon dioxide based fluid or foam.

The composition can also include a hydrogen ion source, for example, an acid. Suitable acids include lactic acid, polylactic acid, chloracetic acid, citric acid, oxalic acid, benzoic acid, furoic acid, or other solid organic acids. Alternatively, the acid can be an inorganic acid, for example hydrochloric acid.

The acid can be encapsulated in a second polymer. The second polymer can be a polymer matrix, for example polyvinyl butyral polymer, vinyl acetal polymers, butyral polymers, styrene/-maleic anhydride copolymers, or alkylated vinylpyrrolidone copolymers. The second polymer can be an enteric coating, for example methylacrylate-methacrylic acid copolymers, cellulose acetate phthalate, cellulose acetate succinate, hydroxypropylmethyl cellulose phthalate, hypromellose acetate succinate polyvinyl acetate phthalate, shellac, cellulose acetate trimellitate, sodium alginate, or zein.

The acid or encapsulated acid can be dissolved in a fluid medium or fracturing fluid to be used in treating kerogen. The fracturing fluid can be an aqueous solution. Alternatively, the fracturing fluid can be a carbon dioxide based fluid or foam.

The encapsulated salt or mixture of encapsulated salts can be flowed into a subterranean formation where kerogen is present. After the salt or mixture of salts has been flowed into the formation, an acid can be flowed into the formation. The polymer matrix or enteric coating degrades in the subterranean formation, and the salts and the acid then come into contact. The protonation of the bromate or chlorate anion results in the formation of an unstable oxo-acids. These oxo-acids then decompose to form their respective halogens, for example bromine from HBrO$_3$ and chlorine from HClO$_3$.

In some implementations, the acid can be flowed into a subterranean formation with the same treatment volume as the salt or mixture of salts. In some implementations, the acid can be flowed into a subterranean formation with a different treatment volume than the salt or mixture of salts.

In some implementations, the salt or mixture of salts and the acid are flowed into the subterranean formation simultaneously.

In the above described compositions and methods, the encapsulation of one or more polyhalogen salts results in the delayed generation of halogen. The halogen is generated in the subterranean formation that contains kerogen, which results in increased safety and prevents the halogen from reacting prematurely, for example by degrading hydraulic fracturing equipment.

Figure 3:
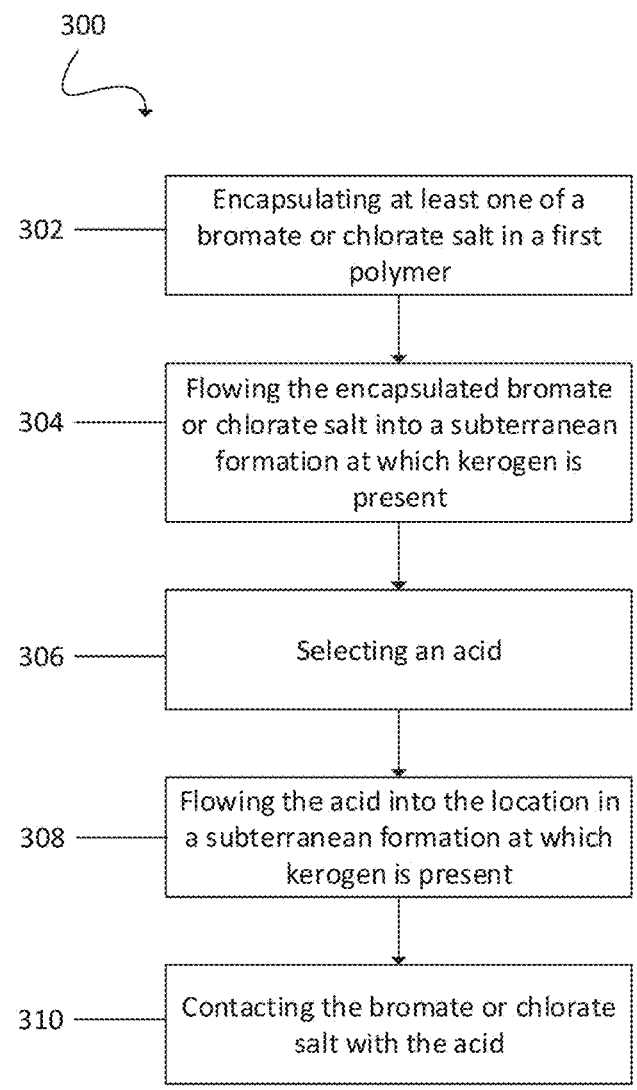
FIG. 3 is a flow chart illustrating an example method of treating kerogen in a subterranean formation.

FIG. 3 is an example of a method 300 for treating kerogen in a subterranean zone. At 302, at least one of a bromate or chlorate salt is encapsulated in a first polymer. At 304, the encapsulated bromate or chlorate salt is flowed into a subterranean formation at which kerogen is present. At 306, an acid is selected. At 308, the acid is flowed into the subterranean formation at which kerogen is present. At 310, the bromate or chlorate salt is contacted with the acid.

Another approach for generating halogens in situ is the reduction of chlorate, bromate, or iodate salts. When reduced, salts that contain chlorate, bromate, or iodate anions generate bromine, chlorine, and iodine, respectively (Eq. 8-10).

$$ClO_3^- + Red_i \rightarrow Cl_2 + Red_f \quad (Eq. 8)$$

$$BrO_3^- + Red_i \rightarrow Br_2 + Red_f \quad (Eq. 9)$$

$$IO_3^- + Red_i \rightarrow Red_f \quad (Eq. 10)$$

Equations 11 and 12 schematically illustrate how a bromate, chlorate, or iodate anion ($XO_3^-$) can react with an initial reducing agent ($Red_i$) to produce a halogen ($X_2$) and a subsequent reducing agent ($Red_f$), where $k_1$ represents the rate constant for the reaction. In some circumstances, $Red_i$ can react with the generated halogen ($X_2$) to generate a halide ion ($X^-$), where $k_2$ is the rate constant for the reaction.

$$XO_3^- + Red_i \xrightarrow{k_1} X_2 + Red_f \quad (Eq. 11)$$

$$X_2 + Red_i \xrightarrow{k_2} X^- + Red_f \quad (Eq. 12)$$

In situations where $k_2$ is much less than $k_1$, equation 11 will occur at a faster rate than equation 12, meaning $X_2$ is not substantially consumed by $Red_i$. In this situation, the majority of $X_2$ is available for reaction with kerogen. Inversely, if $k_2$ is greater than $k_1$, the halogen $X_2$ may be consumed by $Red_i$ before it reacts with kerogen. Therefore reducing agents with a faster rate of reaction with oxo-anions ($XO_3^-$) relative to halogens ($X_2$) are suitable for generating halogens to treat kerogen.

Another approach for the efficient reduction of oxo-anions is to use a reducing agent with a standard oxidation potential (Q) between that of the halogen and the oxo-anion. This ensures that the reduction of oxo-anions is more favorable than the reduction of halogens.

For example, the reaction between bromate and a reducing agent $Red_i$ can be expressed as two half reactions:

$$2[BrO_3]^- + 12H^+ + 10e^- \rightarrow Br_2 + 6H_2O \quad E_{red} = 1.48V \quad (Eq.13)$$

$$Red_i \rightarrow Red_f + 2e^- \quad E_{ox} = Q \quad (Eq.14)$$

where $E_{red}$ and $E_{ox}$ are the standard reduction and oxidation potentials of the respective half reactions.

Similarly, the reaction between bromine and a reducing agent $Red_i$ can be expressed as two half reactions:

$$Br_2 + 2e^- \rightarrow 2Br^- \quad E_{red} = 1.08V \quad (Eq.15)$$

$$Red_i \rightarrow Red_f + 2e^- \quad E_{ox} = Q \quad (Eq.16)$$

where $E_{red}$ and $E_{ox}$ are the standard reduction and oxidation potentials of the respective half reactions.

The difference in the reduction and oxidation potentials ($E_{red} - E_{ox}$) indicates whether the overall oxidation-reduction reaction is thermodynamically favorable. If the difference in reduction and oxidation potentials is positive, the reaction is favorable.

Accordingly, if Q is between 1.48V and 1.08V, the reduction of bromate will be thermodynamically favorable whereas the reduction of $Br_2$ will not be thermodynamically favorable.

As an illustration, if the reducing agent $Red_i$ has an oxidation potential Q of 1.2V, the difference in reduction and oxidation potentials between the bromate anion and the reducing agent will be 1.48V−1.2V, or 0.28V. The positive difference indicates that the reaction is thermodynamically favorable. However, the difference in reduction and oxidation potentials between the halogen Bra and the reducing agent will be 1.08V−1.2V, or −0.12V. The negative difference indicates that the reaction is thermodynamically unfavorable.

As these examples illustrate, a reducing agent with a standard oxidation potential between that of the oxo-anion and the halogen will react favorably with the oxo-anion. This ensures that the halogen generated by the reduction of the oxo-anion will be largely available for the treatment of kerogen, as opposed to being consumed by the reducing agent.

As discussed so far in this application, reducing agents with kinetic factors that make them more reactive to the oxo-anions than to the halogen, or reducing agents with a standard reduction potential between the oxo-anion and the halogen are suitable reducing agents. However, these are not necessary characteristics of the reducing agent, and other reducing agents without these kinetic or thermodynamic properties may also be suitable for reducing oxo-anions.

A composition including oxo-anions and reducing agents can be used to treat kerogen. In some implementations, the oxo-anions are encapsulated and the reducing agent is unencapsulated. In some implementations, the reducing agent is encapsulated and the oxo-anions are unencapsulated. In some implementations, the oxo-anions and the reducing agent are both encapsulated.

In some implementations, a composition to treat kerogen in a subterranean formation includes a bromate salt, a chlorate salt, an iodate salt, or mixtures thereof, where the salt or mixture of salts are encapsulated in a first polymer. The composition also includes a reducing agent.

In some implementations, the first polymer is a polymer matrix, for example a polyvinyl butyral polymer, vinyl acetal polymer, butyral polymer, styrene/-maleic anhydride copolymer, or alkylated vinylpyrrolidone copolymer.

In some implementations, the first polymer can be an enteric coating, for example, methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, or zein.

In some implementations, the reducing agent can have a standard reduction potential between that of the bromate or chlorate salt and the corresponding halogen. For bromate salts, the corresponding halogen is bromine. For chlorate salts, the corresponding halogen is chlorine. For iodate salts, the corresponding halogen is iodine.

In some implementations, the reducing agent can be sulfur, red phosphorus, bisulfate, iodide, or iodine.

In some implementations, the reducing agent is encapsulated in a second polymer. The second polymer can be a polymer matrix, for example a polyvinyl butyral polymer, vinyl acetal polymer, butyral polymer, styrene/-maleic anhydride copolymer, or alkylated vinylpyrrolidone copolymer. In some implementations, the second polymer can be an enteric coating, for example methyacrylate-methacrylic acid copolymer, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, or zein.

Figure 4:
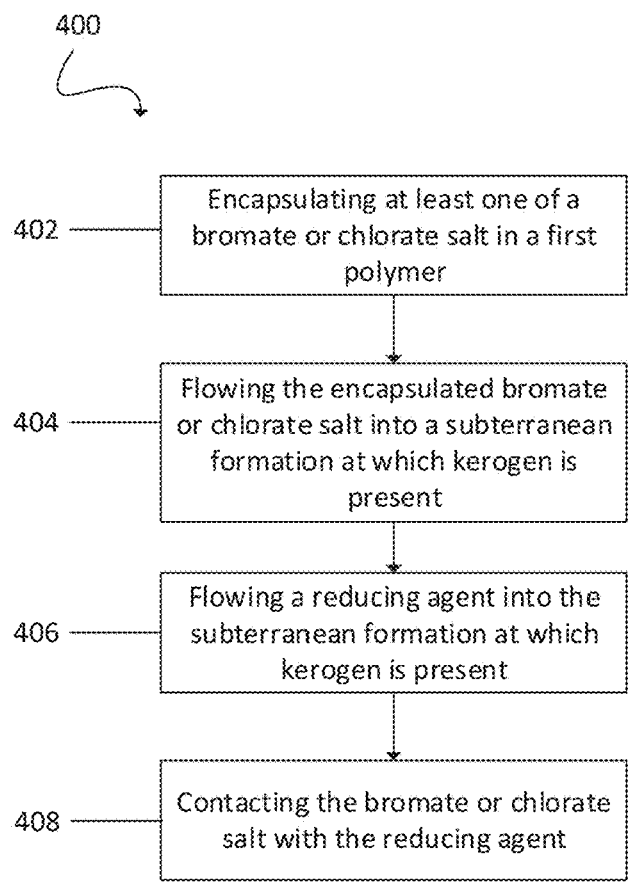
FIG. 4 is a flow chart illustrating an example method of treating kerogen in a subterranean formation.

FIG. 4 shows an example of a method for treating kerogen in a subterranean zone 400 includes encapsulating the at least one of a bromate, chlorate, or iodate salt in a first polymer. At 402, the encapsulated salt or salts are flowed into a subterranean formation where kerogen is present. At 406, a reducing agent is flowed into the subterranean formation where kerogen is present. At 408, the salt or salts are then in contact with the reducing agent.

In the above described compositions and methods, the halogen is not generated until the salt or salts are in contact with the reducing agent. This happens in the subterranean formation, and therefore the reactive halogen is not generated prematurely, such as above ground or in transit to the subterranean formation. This results in increased safety and prevents the halogen from degrading drilling equipment.

Figure 5A:
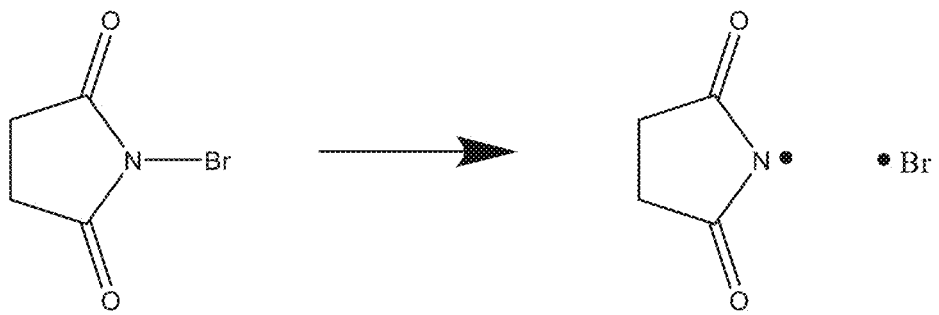
FIG. 5A shows an example reaction scheme of homolytic fission of N-bromosuccinimide.
Figure 5B:
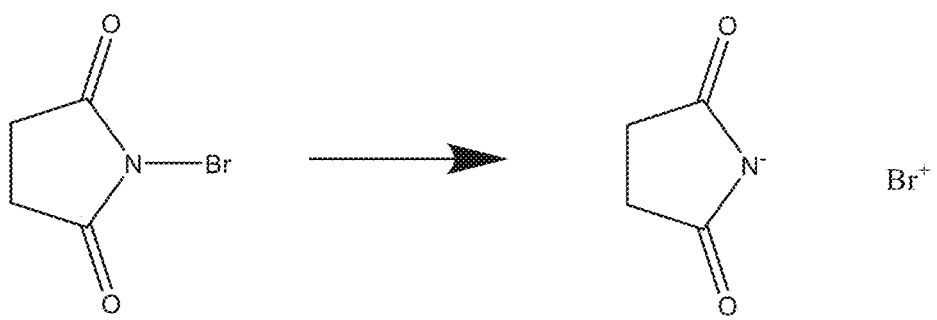
FIG. 5B shows an example reaction scheme of heterolytic fission of N-bromosuccinimide.

Another approach for generating a halogen in situ is the use of N-halosuccinimides, for example N-bromosuccinimide, N-chlorosuccinimide, or N-iodosuccinimide. These compounds are soluble in organic solvents as well as in water. Homolytic or heterolytic fissions of these compounds results in a halogen radical or halogen ion. For example, the homolytic fission of N-bromosuccinimide results in a bromine radical (FIG. 5A). The heterolytic fission of N-bromosuccinimide results in bromonium (FIG. 5B). Fission can occur upon exposure of the N-halosuccinimides to heat or light. In some implementations, heat from the subterranean formation can initiate the reaction. Radical initiators such as benzoyl peroxide can also be used. The halogen radical or halonium can react with and degrade kerogen.

N-halosuccinimides are solids at room temperature, stable, and easy to handle. N-halosuccinimides can be dissolved in an aqueous or organic solvents prior to being injected into a well. The stability prior to solubilization and the solubility in both aqueous and organic solvents make these compounds safe and practical means for generating halogens to treat kerogen.

In some implementations, a composition for treating kerogen in a subterranean formation includes at least one N-halosuccinimide dissolved in a fracturing fluid. The concentration of the N-halosuccinimde in the fracturing fluid can be between 0.001 M and 0.10 M. In some implementations, the fracturing fluid is an aqueous-based fluid. In some implementations, the fracturing fluid is a carbon dioxide-based fluid or foam.

In some implementations, an N-halosuccinimide can be encapsulated. Encapsulation of the N-halosuccinimide delays its reaction with substrate. Once the radical or halonium forms, it can react quickly with available reducing agents. Encapsulation can delay the reaction of the radical or halonium until it has reached kerogen in the formation. In addition, other available reducing agents that are inherent in the formation could potentially react with the radical or halonium before they reach the kerogen. In some implementations, the N-halosuccinimide is encapsulated in a polymer and dissolved in a carbon dioxide-based fluid or foam. The polymer can be a polymer matrix, for example a polyvinyl butyral polymer, vinyl acetal polymer, butyral polymer, styrene/-maleic anhydride copolymer, or alkylated vinylpyrrolidone copolymer. In some implementations, the polymer can be an enteric coating, for example methylacrylate methacrylic acid copolymer, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, or zein.

The encapsulated N-halosuccinimide can be dissolved in a carbon-dioxide based fluid at a concentration of 5 to 100 pounds of encapsulated N-halosuccinimide per 1000 gallons of carbon dioxide-based fluid.

Figure 6:
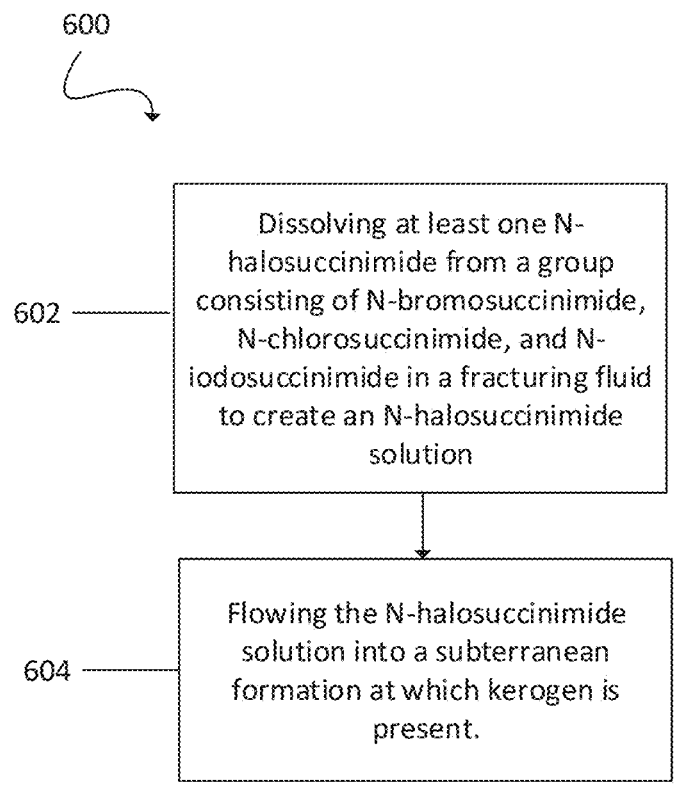
FIG. 6 is a flow chart illustrating an example method of treating kerogen in a subterranean formation.

FIG. 6 shows an example of a method 600 for treating kerogen in a subterranean formation. At 602, at least one N-halosuccinimide from a group consisting of N-bromosuccinimide, N-chlorosuccinimide, and N-iodosuccinimide is dissolved in a fracturing fluid to create an N-halosuccinimide solution. At 604, the N-halosuccinimide solution is flowed into a subterranean formation at which kerogen is present.

As N-halosuccinimides are stable chemicals, the generation of the halogen radicals or ions is delayed until they reach the subterranean zone and are therefore safer to use in the field than native halogens.

EXAMPLES

Example 1: Reaction of Bromine with Kerogen in a Water-Based Medium

Kerogen samples can be segregated into samples with relatively low pyrite concentration and relatively high concentration using density liquid separation, for example with zinc bromide. Kerogen samples with relatively low pyrite concentration float (<1.8 g/cc) whereas sample with relatively higher pyrite concentration sink (>1.8 g/cc). A piece of floated, thermally mature kerogen weighing 101.9 mg was suspended in 25 mL of de-ionized water in a glass pressure tube. Next, 0.17 mL (3.3 mmol) of Br$_2$ was added to the mixture, and the tube was sealed and heated to 150° C. in an oil bath for 3 hours. The mixture was then filtered and the isolated kerogen collected, dried, and weighed. The mass of the kerogen before treatment was 99.1 mg. The mass of the kerogen after treatment was 122.9 mg. Therefore, there was a greater that 20% increase in mass that can be attributed to the reaction of bromine with the kerogen sample.

Example 2: Reaction of Bromine in Supercritical $CO_2$ with Shale Rock Samples #1-3

Figure 7A:
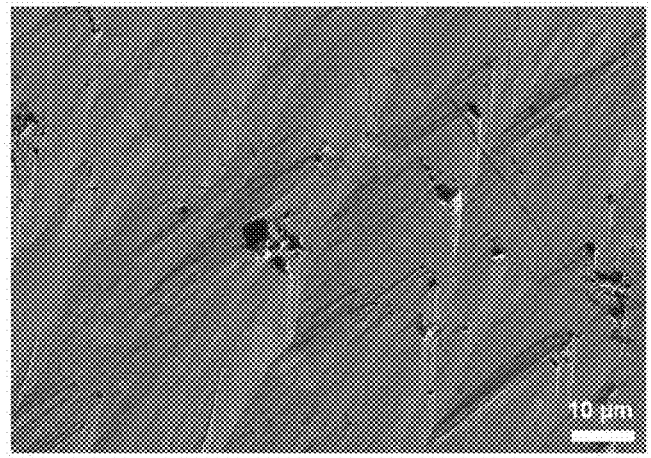
FIG. 7A shows an example scanning electron microscope (SEM) image of a first shale sample before treatment with bromine.
Figure 7B:
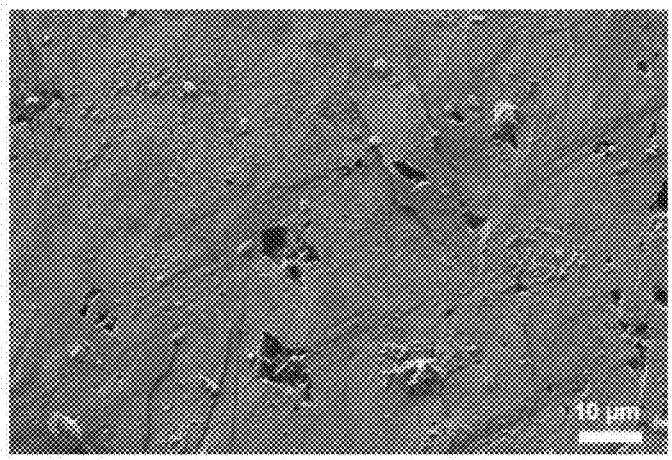
FIG. 7B shows an example SEM image of the first shale sample after treatment with bromine.
Figure 7C:
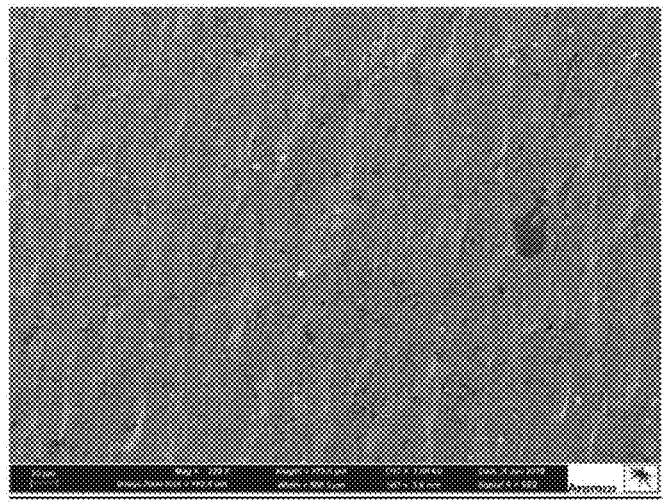
FIG. 7C shows an example SEM image of a second shale sample before treatment with bromine.
Figure 7D:
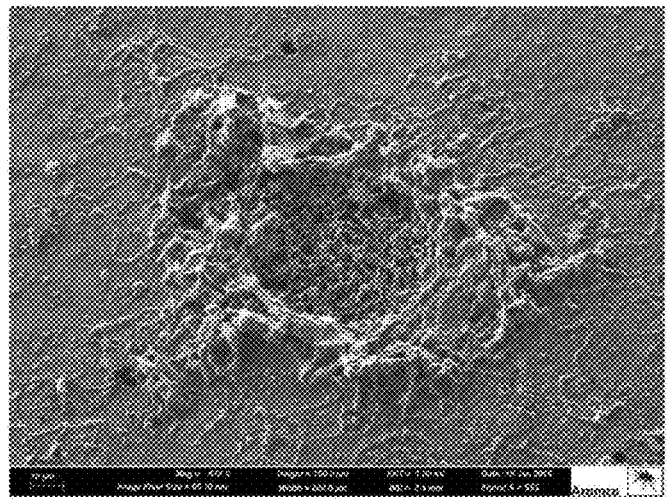
FIG. 7D shows an example SEM image of the second shale sample after treatment with bromine.
Figure 7E:
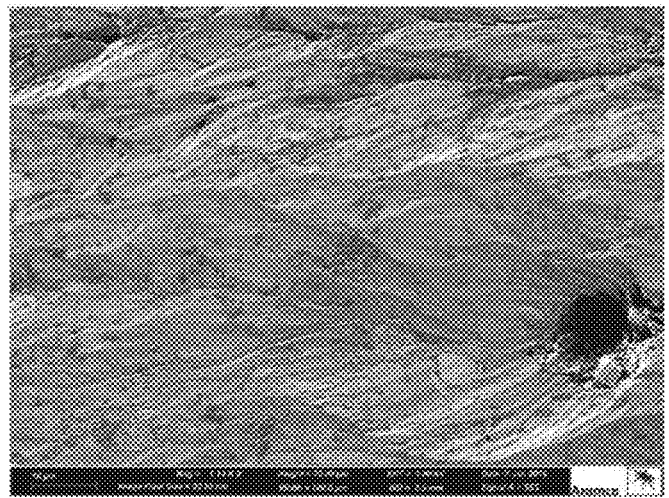
FIG. 7E shows an example SEM image of a third shale sample before treatment with bromine.
Figure 7F:
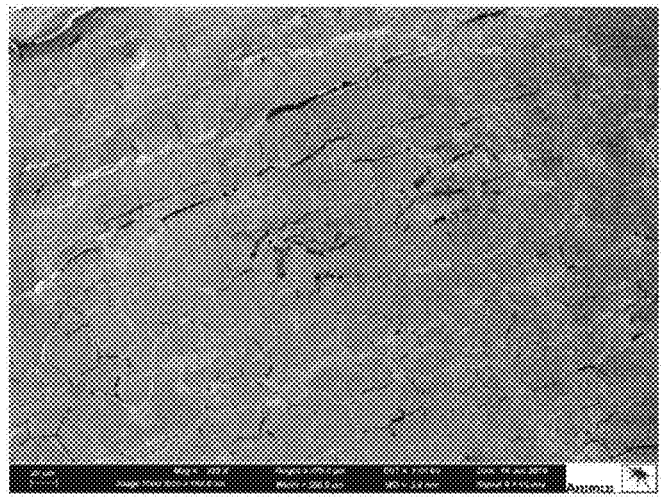
FIG. 7F shows an example SEM image of the third shale sample after treatment with bromine.
Figure 8A:
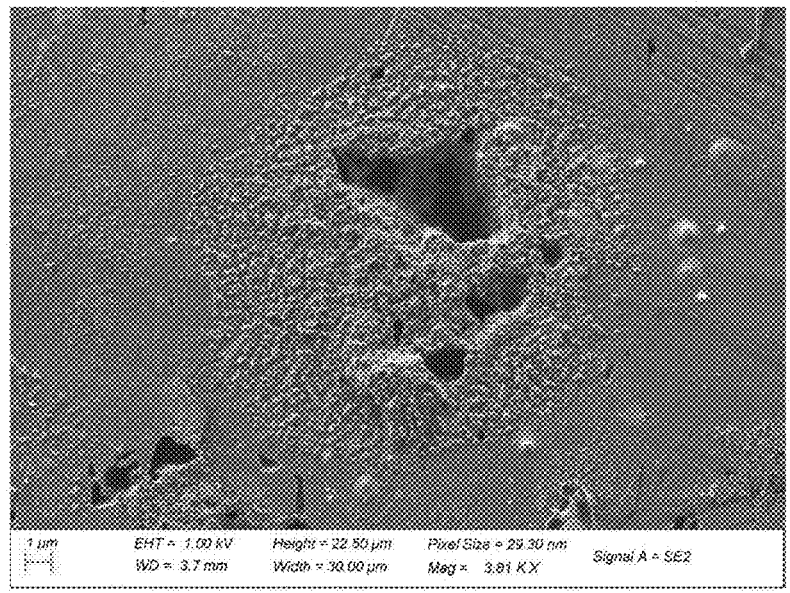
FIG. 8A shows an example SEM image of a shale sample after treatment with bromine.
Figure 8B:
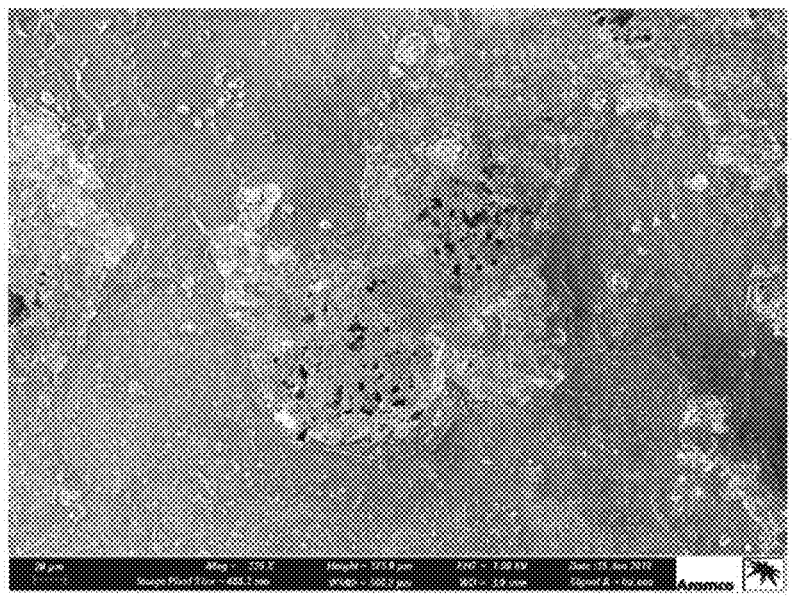
FIG. 8B shows an example SEM image of a shale sample after treatment with bromine.
Figure 8C:
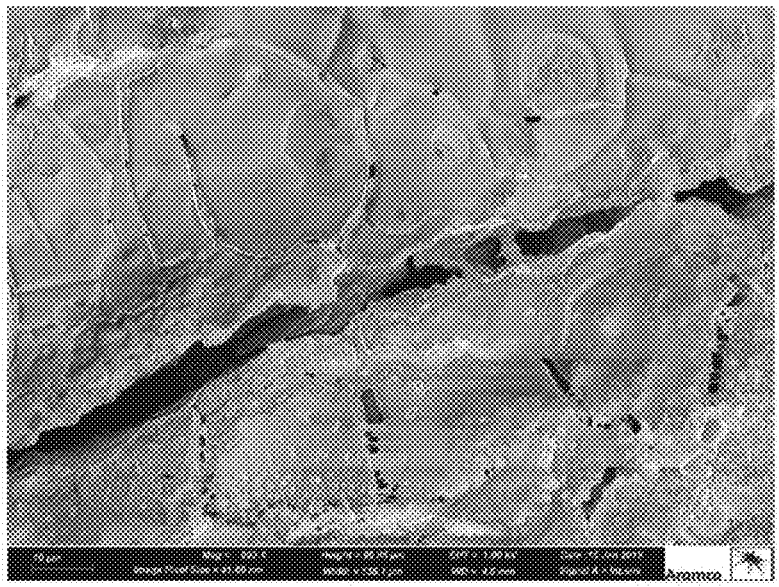
FIG. 8C shows an example SEM image of a shale sample after treatment with bromine.

Shale rock samples #1-3, each with the mineralogical composition given in Table 1, were cut into 1 cm×1 cm×1.5 cm rectangular prisms and broad ion-beam polished to afford a flack surface. The samples were then individually placed in a 750 mL high-pressure autoclave composed of corrosion resistant metal alloy. Next, 3 mL of bromine (60 mmol) was added to the samples and the remainder of the autoclave was filled with liquid $CO_2$ at 800 psi. The autoclave was then sealed and heated to 150° C. for 20 hours at a pressure of 2600 psi before being allowed to cool. Scanning electron microscopy (SEM) images of each shale sample before and after treatment were obtained. The first shale sample is shown before treatment in FIG. 7A. The first shale sample is shown after treatment in FIG. 7B. The second shale sample is shown before treatment in FIG. 7C. The second shale sample is shown after treatment in FIG. 7D. The third shale sample is shown before treatment in FIG. 7E. The third shale sample is shown after treatment in FIG. 7F. After treatment with bromine, "eruptions" of brominated kerogen are observed in the shale rock samples, representing partially depolymerized kerogen (FIGS. 8A-C).

TABLE 1

Mineralogy of polish shale sample before treatment

|  | Sample 1 | Sample 2 | Sample 3 |
|---|---|---|---|
| Quartz | 30 | 72 | 25 |
| Albite | 9 | 5 | 4 |
| Orthoclase | 2 | 1 | 8 |
| Chlorite | 9 | 1 | 2 |
| Illite/Mica | 35 | 15 | 34 |
| Illite/Smectite | 7 | 4 | 14 |
| Pyrite | Trace | 1 | 10 |
| Anatase | 2 | Trace | 0.4 |
| Siderite | 5 | 0 | 0 |
| Kaolinite | 1 | Trace | 5 |
| Gypsum | 0 | Trace | 0 |
| Dolomite | 0 | 1 | 0 |

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

The term "downhole" as used in this disclosure refers to under the surface of the earth, such as a location within or fluidly connected to a wellbore.

As used in this disclosure, the term "fracturing fluid" refers to fluids or slurries used downhole during fracturing operations.

As used in this disclosure, the term "fluid" refers to liquids and gels, unless otherwise indicated.

As used in this disclosure, the term "subterranean material" or "subterranean zone" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some implementations, a flow pathway can be a water source and can include water. In some implementations, a flow pathway can be a petroleum source and can include petroleum. In some implementations, a flow pathway can be sufficient to divert water, a downhole fluid, or a produced hydrocarbon from a wellbore, fracture, or flow pathway connected to the pathway.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications may be made without departing from the spirit and scope of the disclosure.

What is claimed is:

1. A composition for treating kerogen in a subterranean formation that comprises a polyhalogen salt encapsulated in a polymer, wherein the polyhalogen salt comprises an anion selected from a group consisting of $Br_3^-$, $Br_2Cl^-$, $BrCl_2^-$, $BrI_2^-$, $Br_2I^-$, $I_3^-$, $ClI_4^-$, $BrI_6^-$, $ICl_2$, $ICl_4^-$ and $I_3Br_4$.

2. The composition of claim 1, wherein the polyhalogen salt further comprises an alkali metal cation or an alkaline earth metal cation.

3. The composition of claim 1, wherein the polyhalogen salt further comprises a quaternary ammonium cation selected from a group consisting of tetramethylammonium, tetraethylammonium, tetrabutylammonium, benzyltrimethylammonium, and cetyltrimethylammonium.

4. The composition of claim 1, wherein the polyhalogen salt further comprises a cation selected from a group consisting of imidazolium, pyridinium, and pyrrolidinium.

5. The composition of claim 1, wherein the polyhalogen salt further comprises a cation with carbon-fluorine bonds.

6. The cation of claim 5, wherein the cation is selected from a group consisting of $[P(CF_3)_4]^+$, $[N(CF_3)_4]^+$, or bis(tri(4-fluorophenyl)phosphine)iminium.

7. The composition of claim 1, wherein the polymer is a polymer matrix selected from a group consisting of polyvinyl butyral polymer, vinyl acetal polymers, butyral polymers, sytrene/-maleic anyhydride copolymers, and alkylated vinylpyrrolidone copolymers.

8. The composition of claim 1, wherein the polymer is an enteric coating, wherein the enteric coating is selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

9. The composition of claim 1, further comprising a carbon dioxide based fluid or foam.

10. The composition of claim 1, further comprising an aqueous fluid.

11. A method of treating kerogen in a subterranean formation, comprising:
selecting a polyhalogen salt;
encapsulating the polyhalogen salt in a polymer;
mixing the encapsulated polyhalogen salt in a fluid; and
flowing the mixture of encapsulated polyhalogen salt and fluid into a location within the subterranean formation at which kerogen is present; wherein selecting the polyhalogen salt includes selecting a salt comprising an anion from a group consisting of $Br_3^-$, $Br_2Cl^-$, $BrCl_2^-$, $BrI_2^-$, $Br_2I^-$, $I_3^-$, $ClI_4^-$, $BrI_6^-$, $ICl_2$, $ICl_4^-$ and $I_3Br_4$.

12. The method of claim 11, wherein mixing the encapsulated polyhalogen salt in a fluid includes mixing the polyhalogen salt in a carbon dioxide-based fluid or foam.

13. The method of claim 11, wherein mixing the encapsulated polyhalogen salt in a fluid includes mixing the polyhalogen salt in an aqueous-based fluid.

14. The method of claim 11, wherein selecting the polyhalogen salt includes selecting a salt comprising a cation from a group consisting of alkali metal cations or alkaline earth metal cations.

15. The method of claim 11, wherein selecting the polyhalogen salt includes selecting a salt that comprises a quaternary ammonium cation selected from a group consisting of tetramethylammonium, tetraethylammonium, tetrabutylammonium, benzyltrimethylammonium, and cetyltrimethylammonium.

16. The method of claim 11, wherein selecting the polyhalogen salt includes selecting a salt that comprises a cation selected from a group consisting of imidazolium, pyridinium, and pyrrolidinium cations.

17. The method of claim 11, wherein selecting the polyhalogen salt includes selecting a salt that comprises a cation with carbon-fluorine bonds.

18. The method of claim 11, wherein selecting the polyhalogen salt includes selecting a salt that comprises a cation selected from a group consisting of $[P(CF_3)_4]^+$, $[N(CF_3)_4]^+$, and bis(tri(4-fluorophenyl)phosphine)iminium cations.

19. The method of claim 11, wherein encapsulating the salt in a polymer includes encapsulating the salt in a polymer matrix selected from a group consisting of polyvinyl butyral polymer, vinyl acetal polymers, butyral polymers, sytrene/-maleic anyhydride copolymers, and alkylated vinylpyrrolidone copolymers.

20. The method of claim 11, wherein encapsulating the polyhalogen salt in a polymer includes encapsulating the salt in an enteric coating, wherein the enteric coating is selected from a group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

* * * * *